(12) United States Patent
Hsu et al.

(10) Patent No.: US 11,182,664 B2
(45) Date of Patent: Nov. 23, 2021

(54) CONFIGURABLE THREE-DIMENSIONAL NEURAL NETWORK ARRAY

(71) Applicants: Fu-Chang Hsu, San Jose, CA (US); Kevin Hsu, San Jose, CA (US)

(72) Inventors: Fu-Chang Hsu, San Jose, CA (US); Kevin Hsu, San Jose, CA (US)

(*) Notice: Subject to any disclaimer, the term of this patent is extended or adjusted under 35 U.S.C. 154(b) by 731 days.

(21) Appl. No.: 16/006,727

(22) Filed: Jun. 12, 2018

(65) Prior Publication Data

US 2019/0108433 A1 Apr. 11, 2019

Related U.S. Application Data

(60) Provisional application No. 62/570,518, filed on Oct. 10, 2017, provisional application No. 62/572,411, filed on Oct. 13, 2017, provisional application No. 62/574,895, filed on Oct. 20, 2017, provisional application No. 62/577,171, filed on Oct. 26, 2017, provisional application No. 62/617,173, filed on Jan. 12, 2018, provisional application No. 62/619,800, filed on Jan. 20, 2018, provisional application No. 62/622,425, filed on Jan. 26, 2018.

(51) Int. Cl.
*G06N 3/04* (2006.01)

(52) U.S. Cl.
CPC .................................... *G06N 3/04* (2013.01)

(58) Field of Classification Search
CPC ........ G06N 3/04; G06N 3/0481; G06N 3/063; H01L 27/11504; H01L 27/11514; H01L 27/224; H01L 27/228; H01L 27/2409; H01L 27/2436; H01L 27/2481
See application file for complete search history.

(56) References Cited

U.S. PATENT DOCUMENTS

2017/0117291 A1* 4/2017 Or-Bach ........... H01L 27/11565

* cited by examiner

*Primary Examiner* — Kyoung Lee
(74) *Attorney, Agent, or Firm* — Intellectual Property Law Group LLP

(57) ABSTRACT

Configurable three-dimensional neural network array. In an exemplary embodiment, a three-dimensional (3D) neural network array includes a plurality of stacked synapse layers having a first orientation, and a plurality of synapse lines having a second orientation and passing through the synapse layers. The neural network array also includes synapse elements connected between the synapse layers and synapse lines. Each synapse element includes a programmable resistive element. The neural network array also includes a plurality of output neurons, and a plurality of select transistors connected between the synapse lines and the output neurons. The gate terminals of the select transistors receive input signals.

17 Claims, 27 Drawing Sheets

CONFIGURABLE THREE-DIMENSIONAL NEURAL NETWORK ARRAY

CLAIM TO PRIORITY

This application claims the benefit of priority based upon U.S. Provisional Patent Application having Application No. 62/619,800, filed on Jan. 20, 2018, and entitled "3D NEURAL NETWORK ARRAY" and U.S. Provisional Patent Application having Application No. 62/622,425, filed on Jan. 26, 2018, and entitled "HIGHLY CONFIGURABLE 3D NEURAL NETWORK ARRAY" and U.S. Provisional Patent Application having Application No. 62/570,518, filed on Oct. 10, 2017, and entitled "3D Neural Network Array" and U.S. Provisional Patent Application having Application No. 62/572,411, filed on Oct. 13, 2017, and entitled "3D Neural Network Array" and U.S. Provisional Patent Application having Application No. 62/574,895, filed on Oct. 20, 2017, and entitled "3D Neural Network Array" and U.S. Provisional Patent Application having Application No. 62/577,171, filed on Oct. 26, 2017, and entitled "Neural Network Training Algorithm" and U.S. Provisional Patent Application having Application No. 62/617,173, filed on Jan. 12, 2018, and entitled "3D Neural Network Array" all of which are hereby incorporated herein by reference in their entireties.

FIELD OF THE INVENTION

The exemplary embodiments of the present invention relate generally to the field of semiconductors, and more specifically to the design and operation of semiconductors forming neural network arrays.

BACKGROUND OF THE INVENTION

A neural network is an artificial intelligence (AI) system that has learning capabilities. AI systems have been used for may applications such as voice recognition, pattern recognition, and hand-writing recognition to name a few.

The typical neural network having neurons connected by synapses may be implemented by using software or hardware. A software implementation of a neutral network relies on a high-performance CPU to execute specific algorithms. For very high density neural networks, the speed of the CPU may become a bottleneck to the performance of real-time tasks. On the other hand, a hardware implementation typically results in circuit sizes that may limit the density or size of the neural network thereby limiting its functionality.

Therefore, it is desirable to have a configurable 3D neural network array that overcomes the problems of conventional arrays.

SUMMARY

A configurable three-dimensional neural network array is disclosed. In various exemplary embodiments, a 3D neural network array includes a plurality of network layers that are interconnected and can be configured through pass gates. By configuring the array, any number of neurons can be configured to perform a particular task. This also allows one array structure to be easily sub-divided into multiple arrays. In accordance with the exemplary embodiments, the output neurons of one network layer are directly connected to select gates of an adjacent layer without the use of operational amplifiers or comparator. The result is a fast, high density configurable neural network array.

In an exemplary embodiment, a three-dimensional (3D) neural network array is disclosed that includes a plurality of stacked synapse layers having a first orientation, and a plurality of synapse lines having a second orientation and passing through the synapse layers. The neural network array also includes synapse elements connected between the synapse layers and synapse lines. Each synapse element includes a programmable resistive element. The neural network array also includes a plurality of output neurons, and a plurality of select transistors connected between the synapse lines and the output neurons. Gate terminals of the select transistors receive input signals.

In an exemplary embodiment, a method for generating a 3D neural network array is disclosed. The method comprises operations of forming output neuron layers, and forming select gates on the output neuron layers. The select gates cross from a first output neuron layer to an adjacent output neuron layer. The method also comprises forming vertical channels on the select gates and forming landing pads on top of the vertical channels. The method also comprises forming multiple synapse layers on top of the select gates, and forming synapse lines through the synapse layers. The synapse lines connect to corresponding landing pads.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Those of ordinary skilled in the art will realize that the following detailed description is illustrative only and is not intended to be in any way limiting. Other embodiments of the present invention will readily suggest themselves to skilled persons having the benefit of this disclosure. Reference will now be made in detail to implementations of the exemplary embodiments of the present invention as illustrated in the accompanying drawings. The same reference indicators or numbers will be used throughout the drawings and the following detailed description to refer to the same or like parts.

Figure 1A:
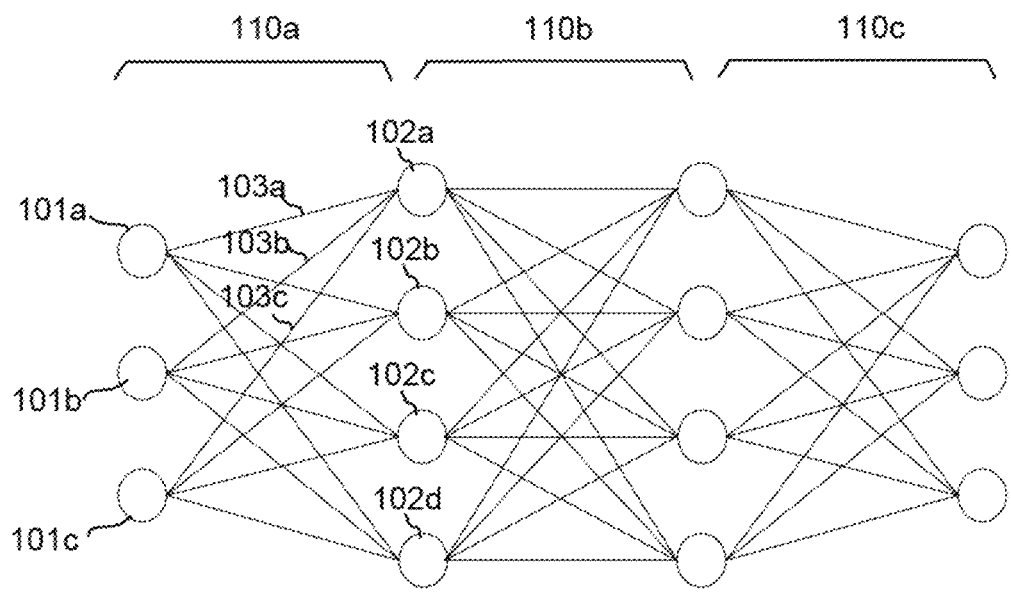
FIG. 1A shows an exemplary embodiment of a neural network structure.

FIG. 1A shows an exemplary embodiment of a neural network structure. The neural network may contain multiple neuron layers, such as layers 110a-c. Each neuron layer may contain input neurons and output neurons. For example, layer 110a has input neurons 101a-c, and output neurons 102a-d. Each input and output neuron of a layer are connected by synapses such as synapses 103a-c. The synapses comprise a certain 'weight' that is applied to signals flowing through the synapse.

Figure 1B:
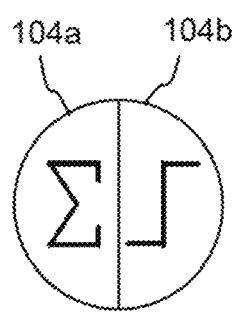
FIG. 1B shows an exemplary embodiment that illustrates basic functions provided by a neuron.

FIG. 1B shows an exemplary embodiment that illustrates basic functions provided by a neuron. For example, the neuron provides a SUM function 104a that sums signals from the previous layer's neurons and the weights, and a ACTIVATION function 104b that generates a non-linear output.

Figure 2A:
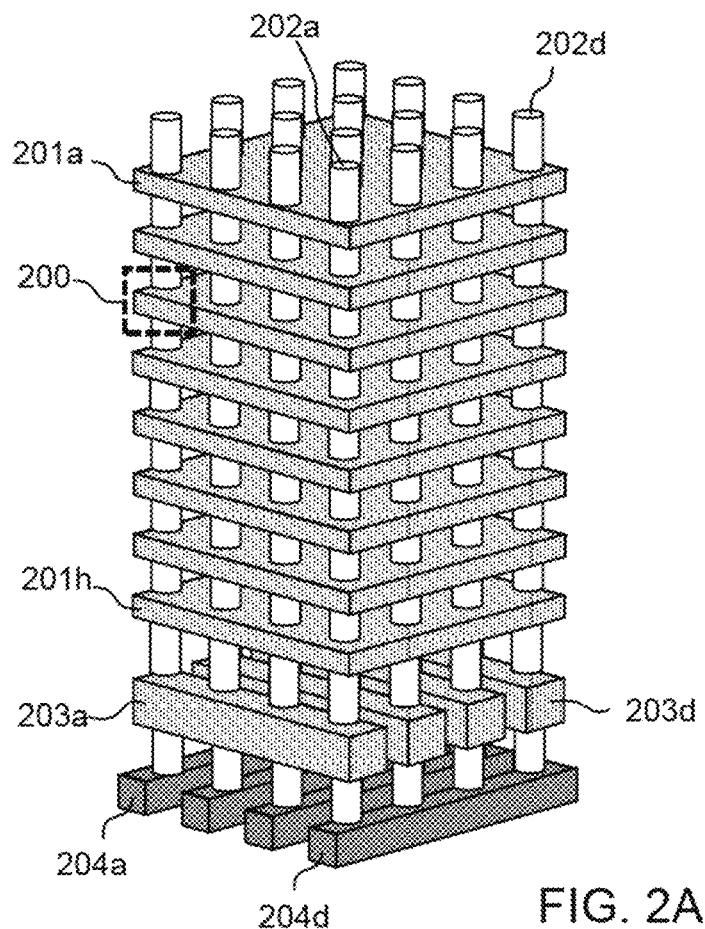
FIG. 2A shows an exemplary embodiment of a 3D neural network array.
Figure 2B:
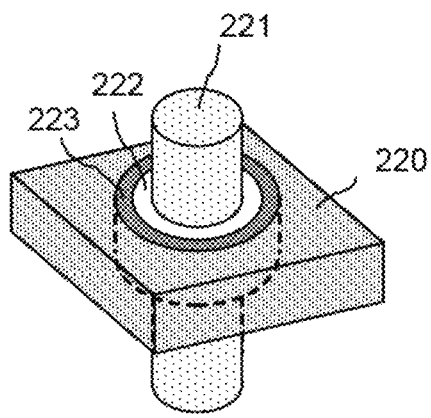
FIGS. 2B-C show two exemplary embodiments of synapse structures.
Figure 2C:
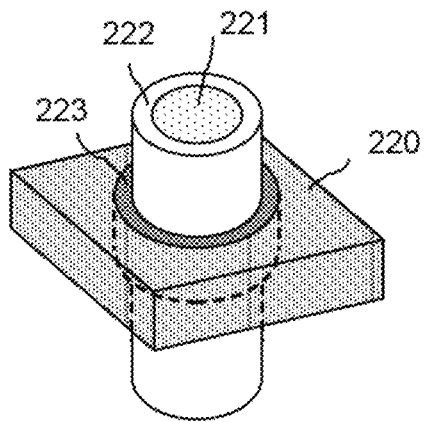

FIG. 2A shows an exemplary embodiment of a 3D neural network array. The array shown in FIG. 2A comprises multiple conductor layers (e.g., 201a-h) called SYNAPSE LAYERS, and multiple vertical conductor layers (e.g., 202a-d), called SYNAPSE LINES. At the intersection of synapse layers and synapse lines are SYNAPSES (e.g., synapse 200). The synapse structure is shown in FIGS. 2B-C. The array also comprises select transistors (e.g., 203a-d), which may be NMOS or PMOS, junction-less or junction devices. The gates of the select transistors are connected to input signals (INPUTS), which are provided by the outputs from a previous layer. Also shown for this layer are OUTPUT NEURONS (e.g., 204a-d). During operation, the select transistors may be turned on to allow current to flow from the synapse lines to the output neurons.

FIGS. 2B-C show two exemplary embodiments of synapse structures. For example, the synapse structures shown in FIGS. 2B-C are suitable for use as synapses in the array shown in FIG. 2A, such as the synapse 200. The synapse structures comprise synapse layer 220 and synapse line 221, which comprise a specific metal, such as Pt, Ti, Ta, Cu, or another suitable conductor. The synapse structures also comprise a resistive element 222, which comprises a material such as HfOx, TaOx, PtOx, TiOx, or phase-change element, ferroelectric material, or magnetic material. The resistance of the resistive element 222 (or phase-change element) may be changed by applying the proper bias conditions on the synapse layer 220 and synapse line 221. The synapse structures also comprise a selector 223, which comprises a diode, Schottky diode, or other threshold-behavior materials such as a diode material, Schottky diode material, NbOx material, TaOx material and VCrOx material. The diode may be unidirectional or bi-directional. It should be noted that for a 3D neural network array, a selector device for each synapse may be used to prevent sneak current leakage path through the unselected synapse layers and synapse lines.

Figure 2D:
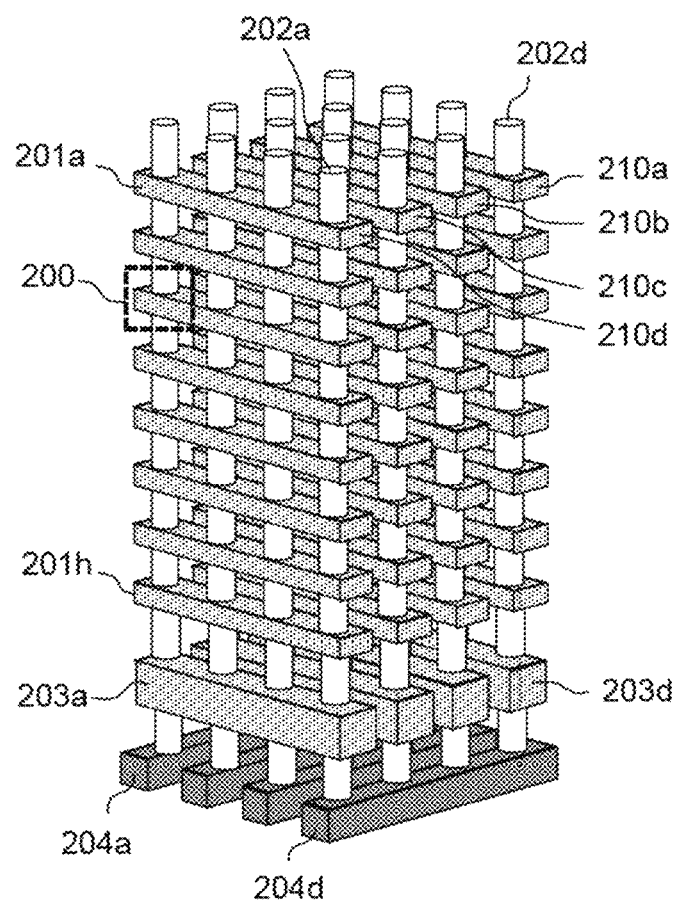
FIGS. 2D-E show exemplary embodiments of 3D neural network arrays.
Figure 2E:
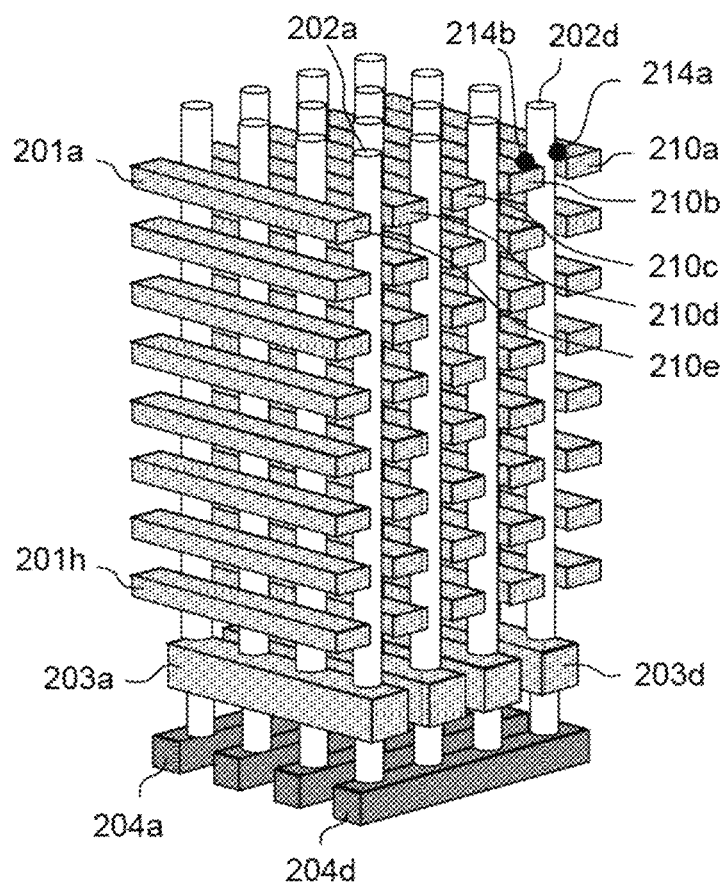

FIGS. 2D-E show exemplary embodiments of 3D neural network arrays.

In FIG. 2D the synapse layers, such as layer 201a may be separated into multiple horizontal lines, such as horizontal lines 210a to 210d. The even lines 210a and 210c may be connected together (not shown), and the odd lines 210b and 201d may be connected together (not shown). When the synapse layer 201a is selected, the even lines 210a and 210c may be supplied with VH to represent 'positive weights' and the odd lines 210b and 210d may be supplied with VL to represent 'negative weights'.

In FIG. 2E the synapse layer such as layer 201a may be separated into multiple horizontal lines, such as lines 210a to 210e. The vertical synapse lines, such as lines 202a to 202d, are formed between the horizontal lines instead of being trenched through the horizontal lines. For example, the vertical synapse line 202d is formed between the horizontal lines 210a and 210b. This structure forms two synapses, as shown at 214a and 214b in the junctions between vertical line 202d and horizontal lines 210a and 210b. The even lines 210a, 210c, and 210e may be connected together (not shown), and the odd lines 210b and 201d may be connected together (not shown). When the synapse layer 201a is selected, the even portions 210a, 210c, and 210e may be supplied with VH to represent 'positive weights' and the odd portions 210b and 210d may be supplied with VL to represent 'negative weights'.

Figure 3:
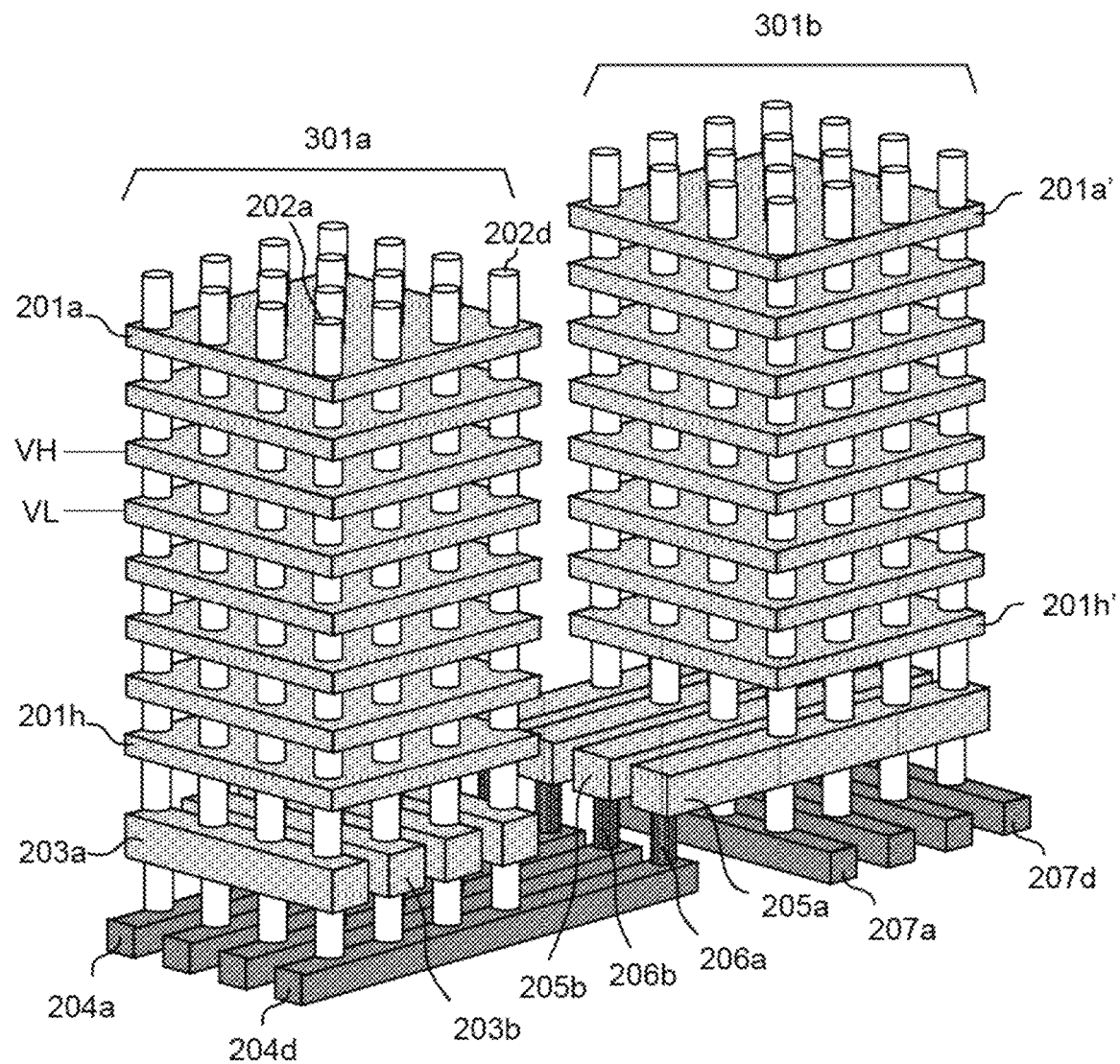
FIG. 3 shows an exemplary embodiment of two connected neuron layers of a neural network.

FIG. 3 shows an exemplary embodiment of two connected neuron layers of a neural network. As illustrated in FIG. 3, neuron layer 301a is connected to neuron layer 301b. For example, the output neurons 204a-d of the first layer 301a are connected to the input neurons 205a-d of the layer 301b through contacts (e.g., contacts 206a-b). In accordance with exemplary embodiments, the output neurons 204a-d are directly connected to the select gates of the next layer's inputs without the use of operational amplifiers or comparators. This significantly reduces circuit size and results in a very compact neural network array. This also allows the synapses layers 201a-h and 201a'-h' to be connected. For ease of understanding, FIG. 3 shows the synapses layers 201a-h and 201a'-h' separated so that is easier to view the connection of the output neurons 204a-d to the select gates 205a-b, however, in an actual implementation, the synapses layers 201a-h and 201a'-h' are connected.

Figure 4A:
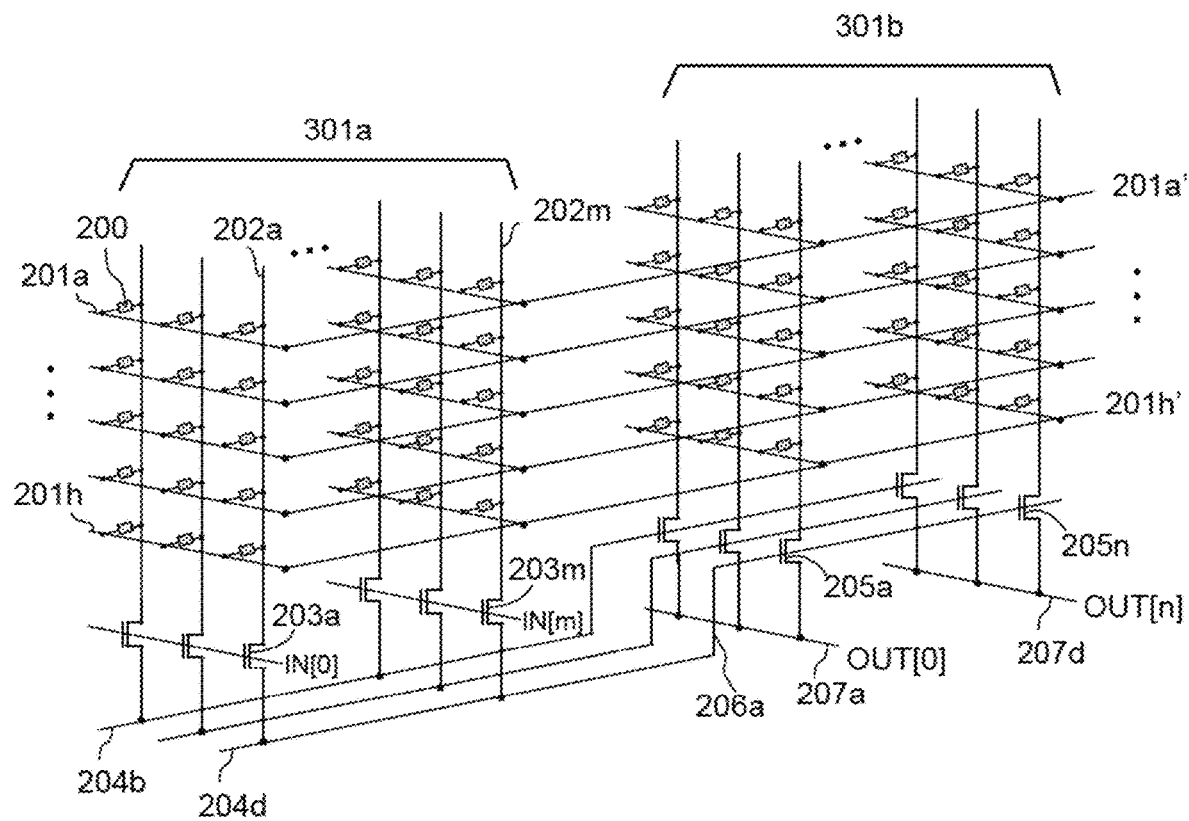
FIG. 4A shows an exemplary embodiment of an equivalent circuit of the array shown in FIG. 3.

FIG. 4A shows an exemplary embodiment of an equivalent circuit of the array shown in FIG. 3. For example, the circuit shown in FIG. 4A includes inputs 203 and outputs 204 for the first network layer 301a, and inputs 205 and outputs 207 for the second network layer 301b. Also shown are contacts 206 between the outputs 204 and the inputs 205.

Figure 4B:
FIG. 4B shows an exemplary embodiment of an equivalent circuit of a synapse element.

FIG. 4B shows an exemplary embodiment of an equivalent circuit of the synapse element. For example, the synapse shown in FIG. 4B is suitable for use as the synapse 200 shown in FIG. 4A. The synapse comprises a selector 401, which may have bidirectional or unidirectional threshold behavior, and a resistive element 402.

Figure 4C:
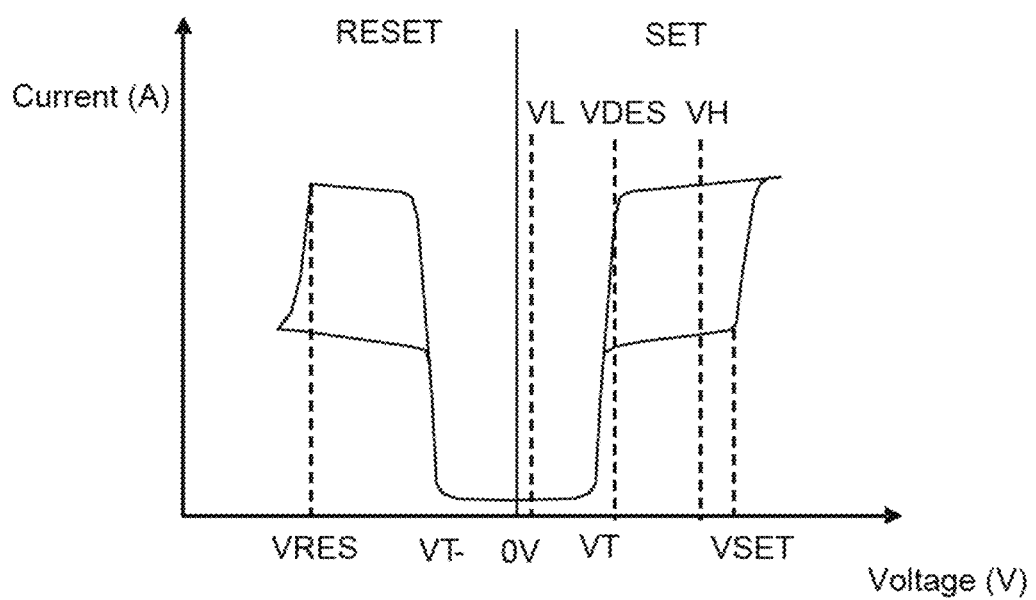
FIG. 4C shows an exemplary current-to-voltage (I-V) curve illustrating the operation of a resistive element that is part of the synapse element shown in FIG. 4B.

FIG. 4C shows an exemplary current-to-voltage (I-V) curve illustrating the operation of a resistive element (e.g., resistive element 402). As illustrated by the I-V curve, Vt and Vt− are the threshold voltage of the selector 401, and VSET and VRES are the voltage levels to program the resistive element 401 to low and high resistances, respectively. For ease of understanding, it will be assumed that VT=0.5V, VT−='0.5V, VSET=2.5V, and VRES=−2.5V.

Referring again to FIG. 4A, a detailed description of the operation of the 3D neural network is provided. The multiple synapse layers (e.g., 201) may store the synapse values (e.g., resistive element values) for different tasks or functions, such as, for example, image recognition or voice recognition. During operation, only one task is selected at a time. For example, each task can be stored in two synapse layers. The selected two layers are supplied with VH and VL, respectively, as shown in FIG. 4C to represent 'positive weights' and 'negative weights' of the synapses. All the other unselected layers are supplied with VDES.

Referring now to FIG. 4C for the levels of VH, VL, and VDES. VH must be higher than VT to conduct current from the synapse layer to the synapse lines. VL must be lower than VT to allow current to flow from the synapse lines to the synapse layer. Due to the threshold function, the voltage of the synapse lines (e.g., 202) will be between (VL+Vt) and (VH−Vt). For example, assuming VH and VL are 2V and 0V, respectively, the synapse line's voltage will be between 0.5V to 1.5V. The level of VDES may be 1.0V to prevent leakage current.

Referring again to FIG. 4A, the current of synapse lines 202a-m will pass through the select transistors 203a-m and 'sum' together in the output neuron 204d. The currents of the select transistors 203a-m are determined by the input voltages IN[0] to IN[m]. When the input voltage is below the threshold voltage of the transistor, the transistor will turn off and thus no current will flow through.

When voltage is passed from the synapse lines to output neurons, the Vt drop of the select transistor may cause the output level to be lower than the synapse lines. When the output neurons' voltages are applied to the gates of the select transistors of the next layer, another Vt drop occurs. This causes the output voltage to degrade.

In an exemplary embodiment, the select transistors are formed using 'native' devices. The Vt of the native device is close to 0V. Therefore, when the synapse lines' voltage, such as 0.5V to 1.5V is passed to the output neurons, the full voltage level of 0.5V to 1.5V can be passed. Therefore, when the voltage is applied to the next layer's select transistors (e.g., 205), it can fully pass the next layer's synapse lines' voltage to the output neurons. According to another exemplary embodiment, the select transistors (e.g., 203) may be low Vt devices or depletion devices.

It should be noted that the 'activation function' of the neurons is performed by the select transistors, which results in a very compact array size. In comparison, conventional arrays usually use operation amplifiers or comparators to perform the threshold function of the neurons, thus require very larger circuit size and limit the number of the neurons of a chip.

Figure 5A:
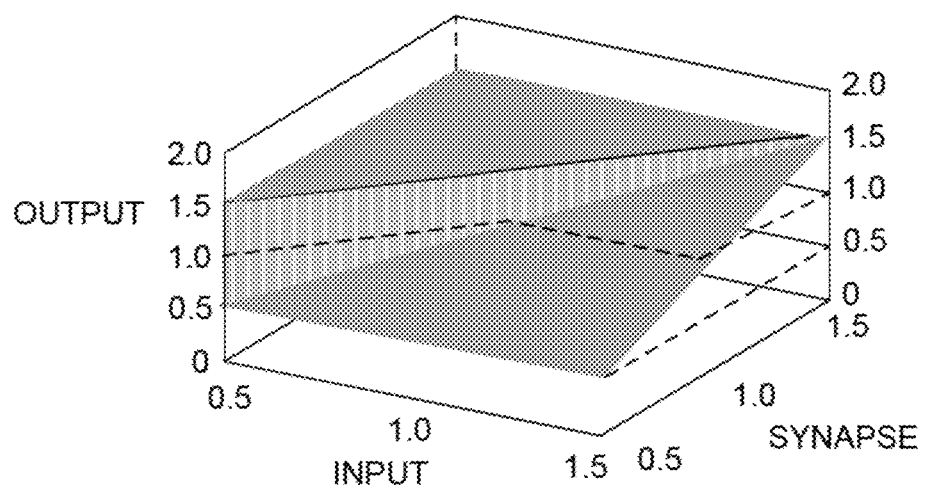
FIGS. 5A-B show exemplary graphs that illustrate the threshold behavior of NMOS and PMOS select transistors, respectively.
Figure 5B:
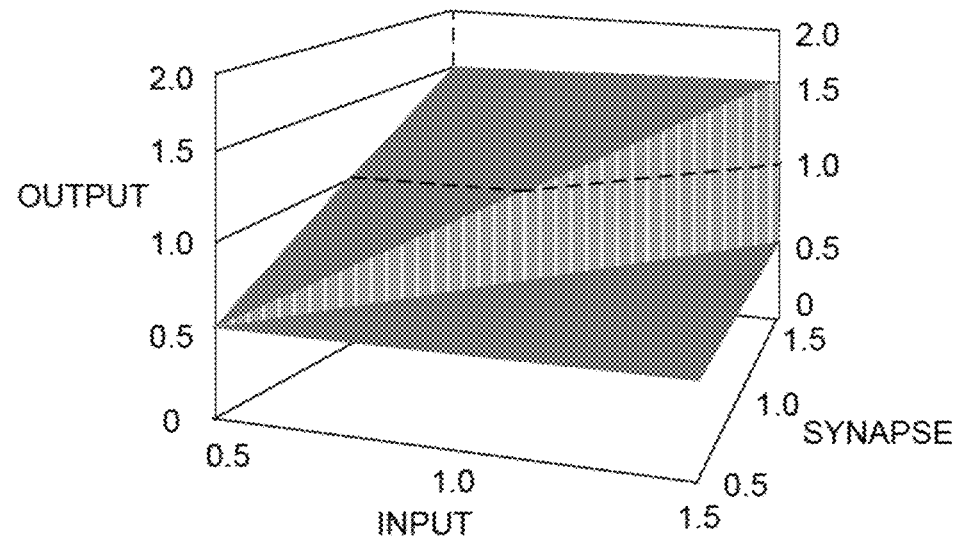

FIGS. 5A-B show exemplary graphs that illustrate the threshold behavior of NMOS and PMOS select transistors, respectively. It should be noted that in these exemplary graphs, the INPUT, SYNAPSE lines, and OUTPUT voltages are all in the same range from 0.5V to 1.5V.

Figure 6:
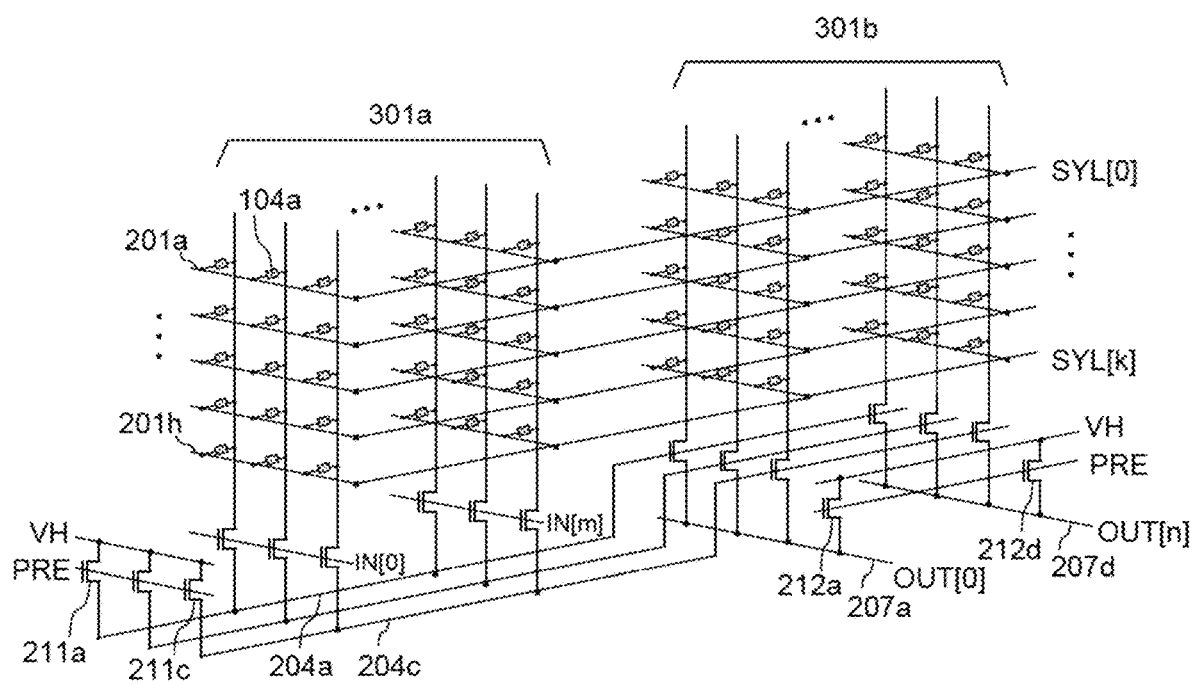
FIG. 6 shows another exemplary embodiment of a neural network array in which pull-up devices are added to the output neurons.

FIG. 6 shows another exemplary embodiment of a neural network array in which pull-up devices 211a-c and 212a-d are added to the output neurons 204a-d and 207a-d, respectively. In this embodiment, the select transistors comprise enhancement devices. For example, when the transistor charges the output neuron to (IN−Vt), the transistor is turned off. The pull-up device then charges the output neuron to the full voltage range such as 2V, thus this configuration compensates for the Vt drop. The pull-up device may be located on the substrate under the 3D array, or formed by using the same type of transistor as the vertical select transistors shown. The pull-up transistors may be PMOS or NMOS. For PMOS, the pull-up device's current will be weaker than the pull-down current of the synapses. For a PMOS embodiment, the gate may be connected to a bias voltage to limit the pull-up current. For an NMOS embodiment, a pre-charge pulse higher than 2.5V may be applied to the gate to pre-charge the output neuron to 2V.

In another exemplary embodiment using PMOS as the select transistors, the devices 211a-c and 212a-d are pull-down devices to fully discharge the output neuron to 0V when the select transistors are turned off.

Figure 7A:
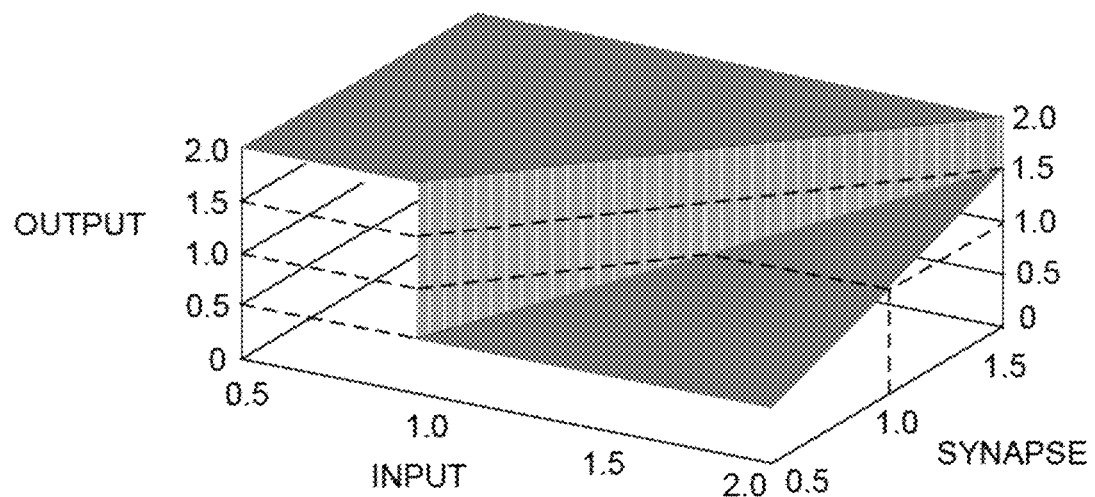
FIGS. 7A-B show exemplary embodiments of graphs that illustrate the threshold behavior of the select transistors using NMOS and PMOS, respectively
Figure 7B:
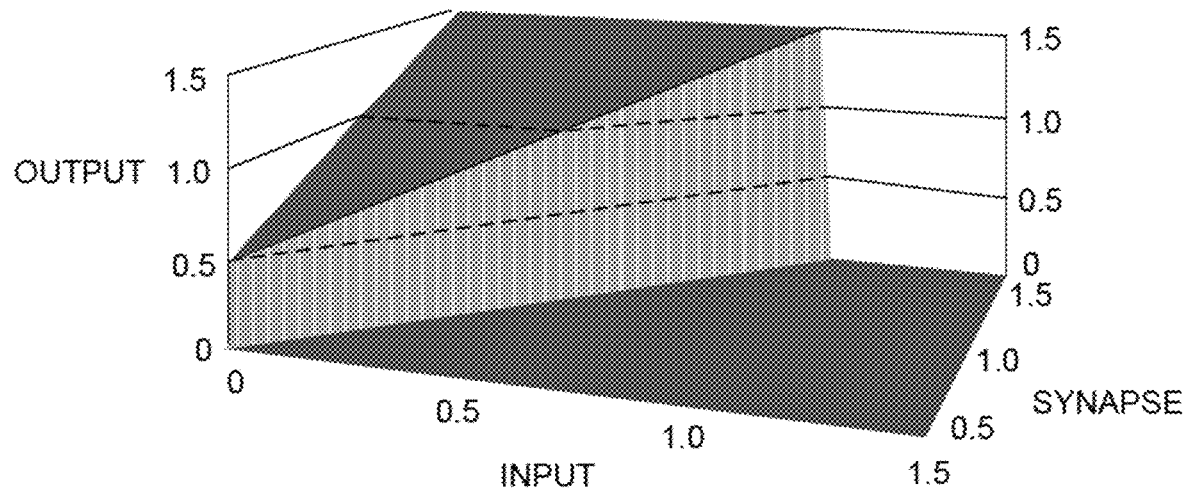

FIGS. 7A-B show exemplary embodiments of graphs that illustrate the threshold behavior of the select transistors using NMOS and PMOS, respectively. It should be noted that the output voltage may be pull high to 2V for FIG. 7A and pull low to 0V for FIG. 7B.

FIGS. 8A-D show an exemplary embodiment of process steps for constructing a 3D neural network array.

Figure 8A:
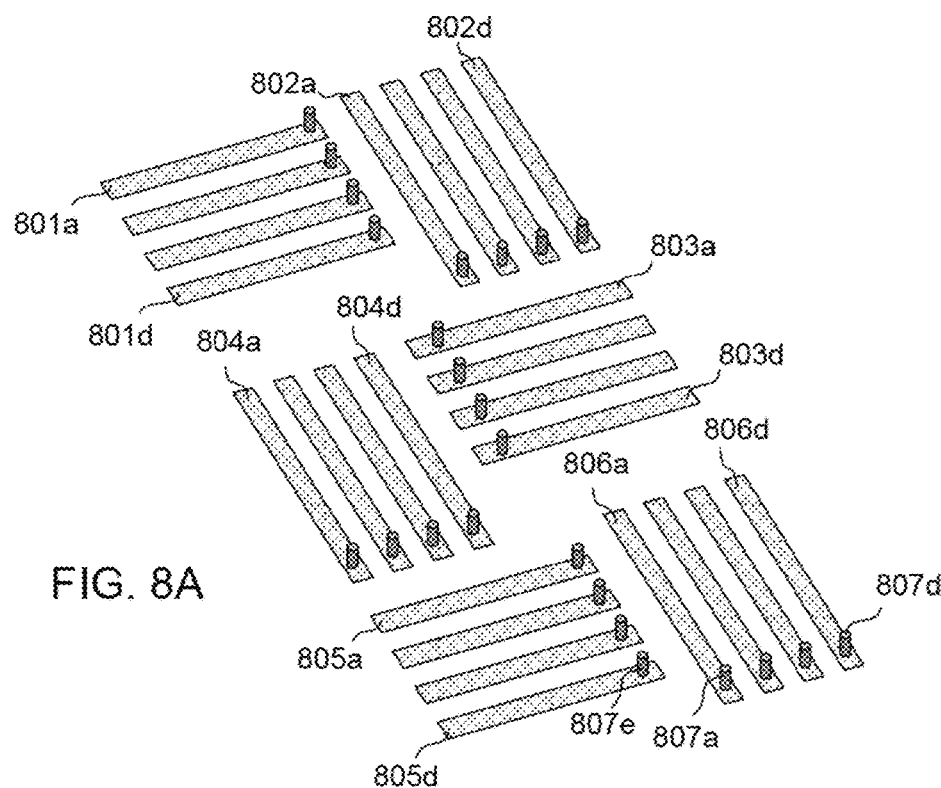
FIGS. 8A-D show an exemplary embodiment of process steps for constructing a 3D neural network array.

FIG. 8A shows an exemplary embodiment of the output neuron layers of the 3D neural network array, which may be formed by a conductor layer such as diffusion, polysilicon, or metal. The output neuron layers comprise a first layer 801a-d, a second layer 802a-d, a third layer 803a-d, a fourth layer 804a-d, and a fifth layer 805a-d. Also shown are contacts 807a-d that are used to connect the output neurons to the gates of the select transistors of the next layer.

Figure 8B:
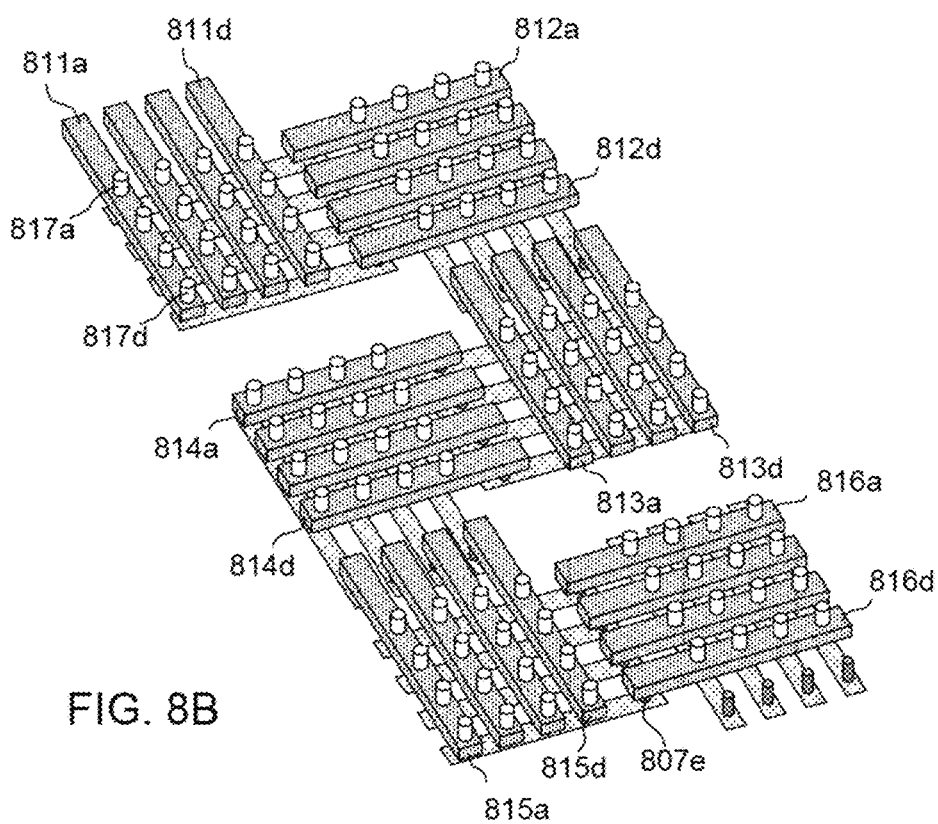

FIG. 8B shows an exemplary embodiment illustrating how select gates 811a-d, 812a-d, 813a-d, 814a-d, 815a-d, and 816a-d are formed on the output neuron layers. Note that the select gates cross one output neuron layer and connect to contacts on an adjacent output neuron layer. For example, the select gate 816d crosses the output layers 806a-d to connect with contact 807e. Next, vertical channels, such as 817a-d, are formed on the select gates.

Figures 8C, 8D:
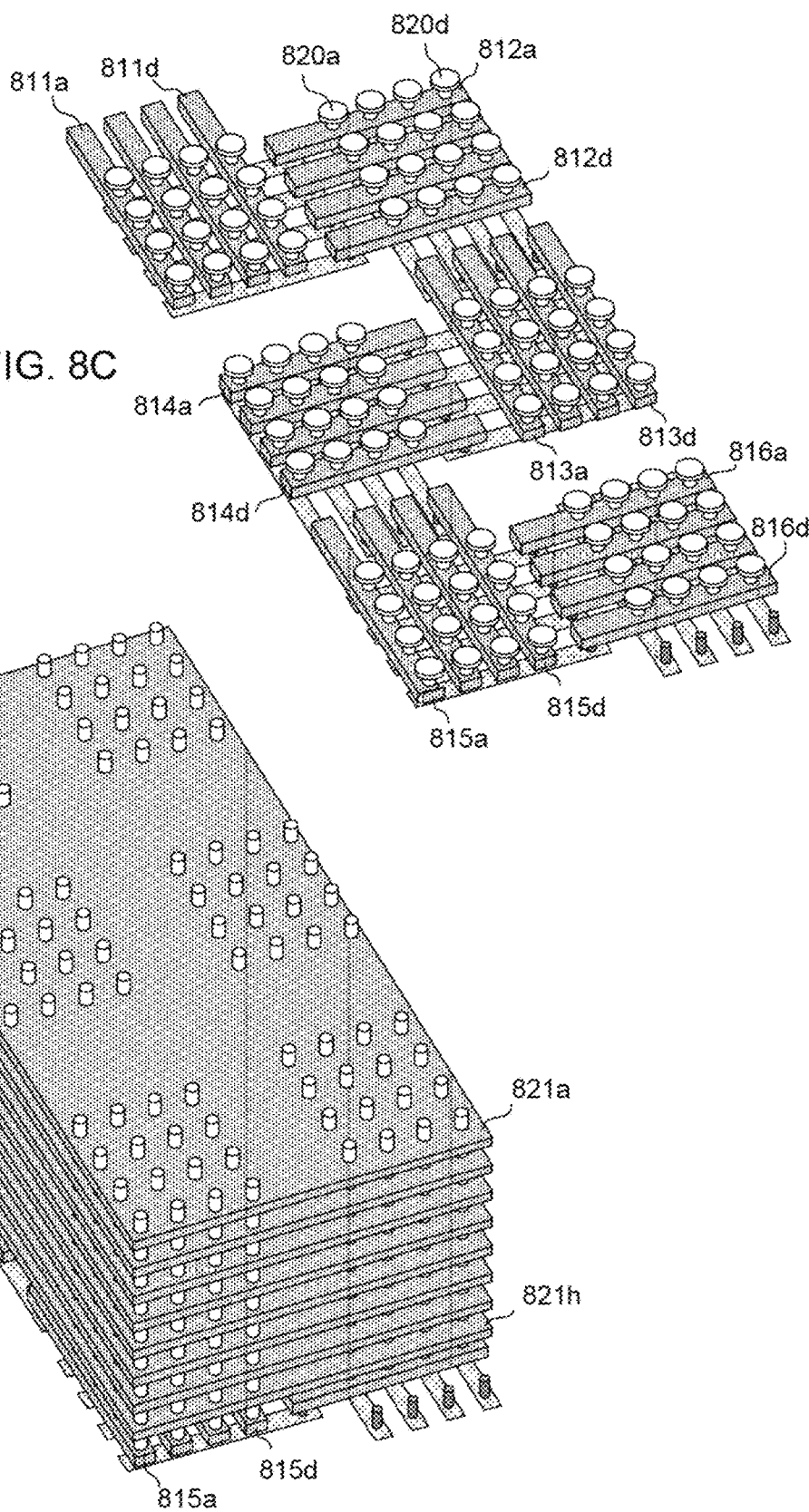

FIG. 8C shows an exemplary embodiment illustrating how landing pads, such as landing pads 820a-d are formed on top of the vertical channels.

FIG. 8D shows an exemplary embodiment illustrating how multiple synapse layers, such as synapse layer 821a-h are deposited on top of the select transistors. Multiple vertical synapse lines, such as 822a-d also are formed through the synapse layers to connect to the landing pads.

Figure 9:
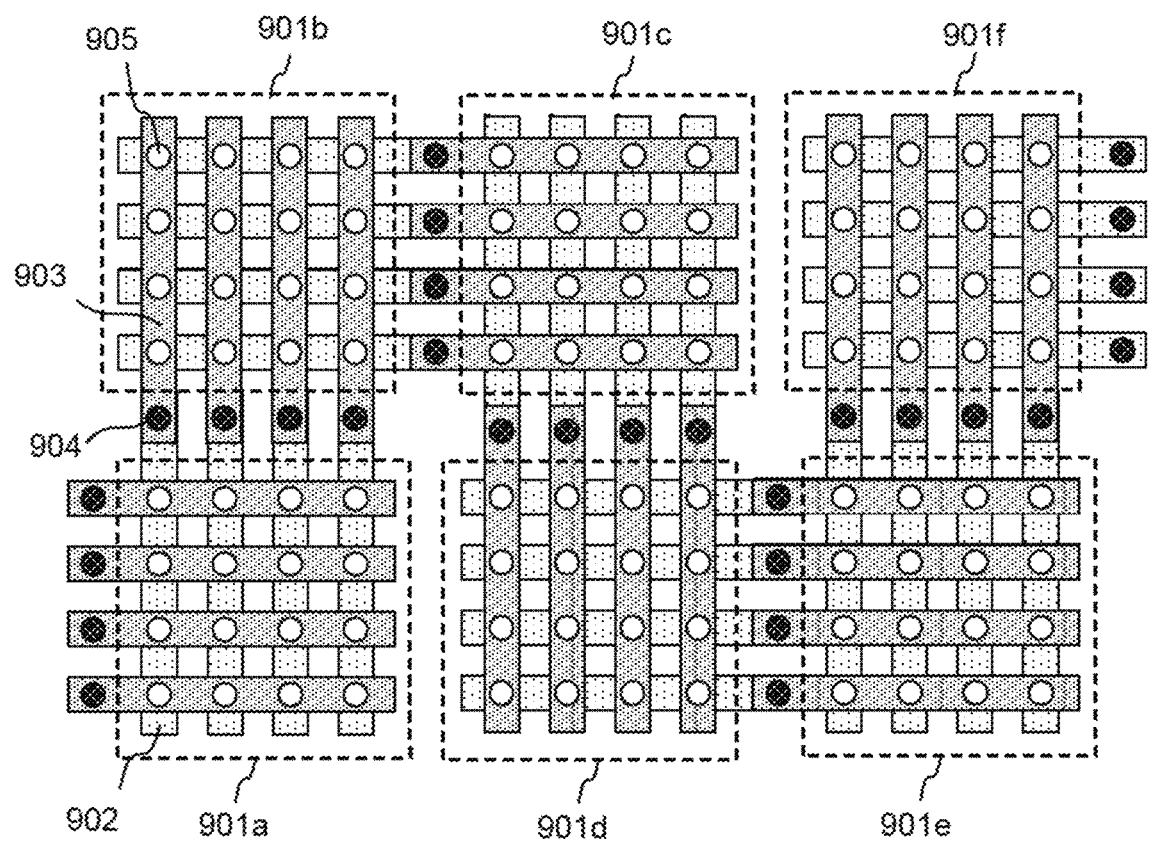
FIG. 9 shows an exemplary embodiment of a top view of the select transistors and output neurons as shown in FIG. 8B.

FIG. 9 shows an exemplary embodiment of a top view of the select transistors and output neurons as shown in FIG. 8B. This top view shows the first layer 901a to the sixth layer 901f. Also shown is an output neuron layer 902 that comprises a conductor such as diffusion, polysilicon, or metal. Select gate 903 is shown and contact 904 connects the output neuron 902 and the select gate 903. Also shown are vertical synapse lines, such as vertical synapse line 905.

Please notice, although the exemplary embodiments show arrays using vertical select transistors, it is obvious that the embodiments can be implemented by using any type of select transistors, such as planar transistors or FinFET. Such variations are within the scope of the exemplary embodiments.

Figure 10:
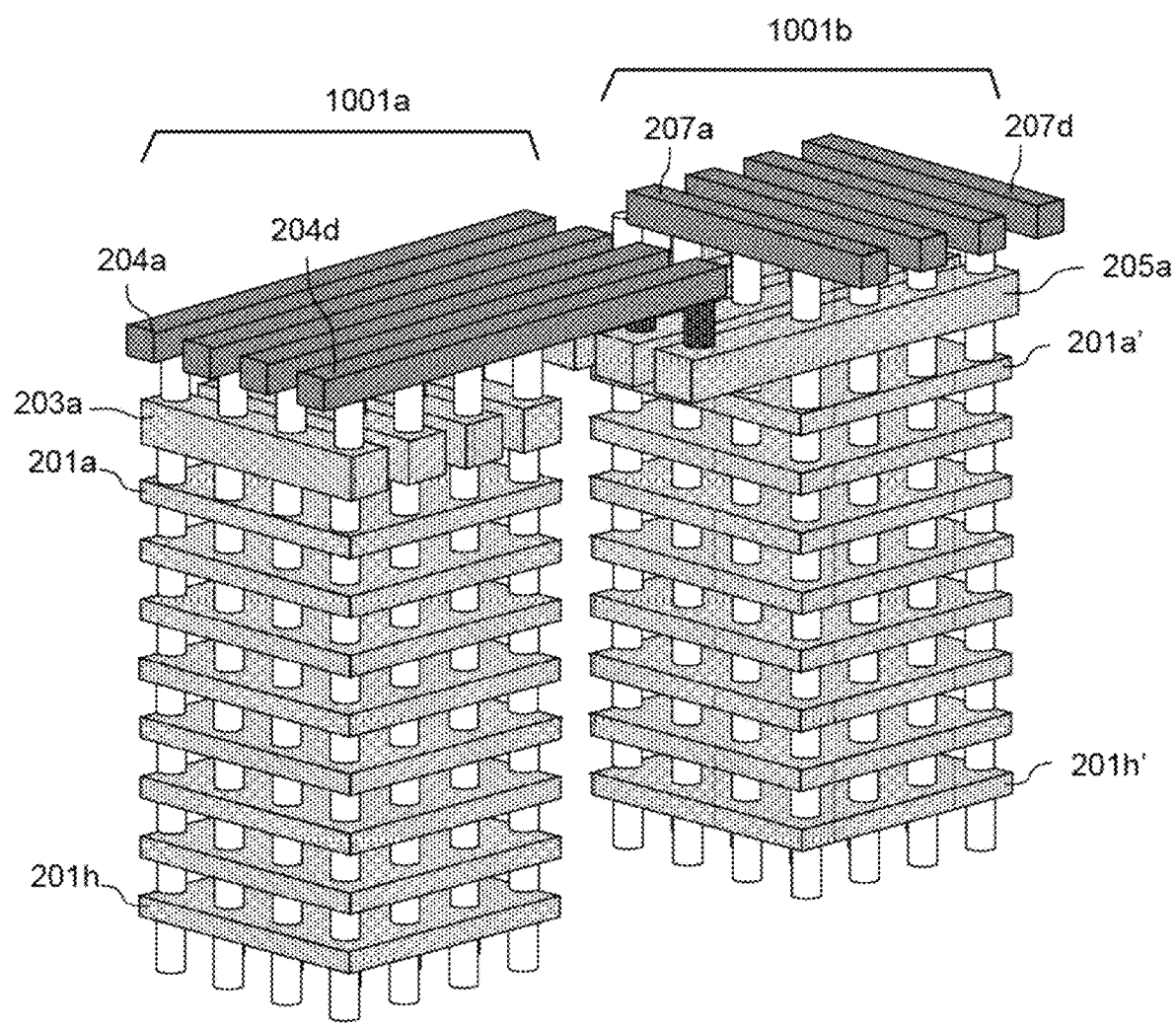
FIG. 10 shows an exemplary embodiment of a 3D neural network array where the select transistors are located on the top of the array.

FIG. 10 shows an exemplary embodiment of a 3D neural network array where the select transistors 203 and 205 are located on the top of the array. In another exemplary embodiment, decoders may be added to the disclosed array architecture to select each neuron in order to apply bias conditions to set and reset the synapses.

Figure 11:
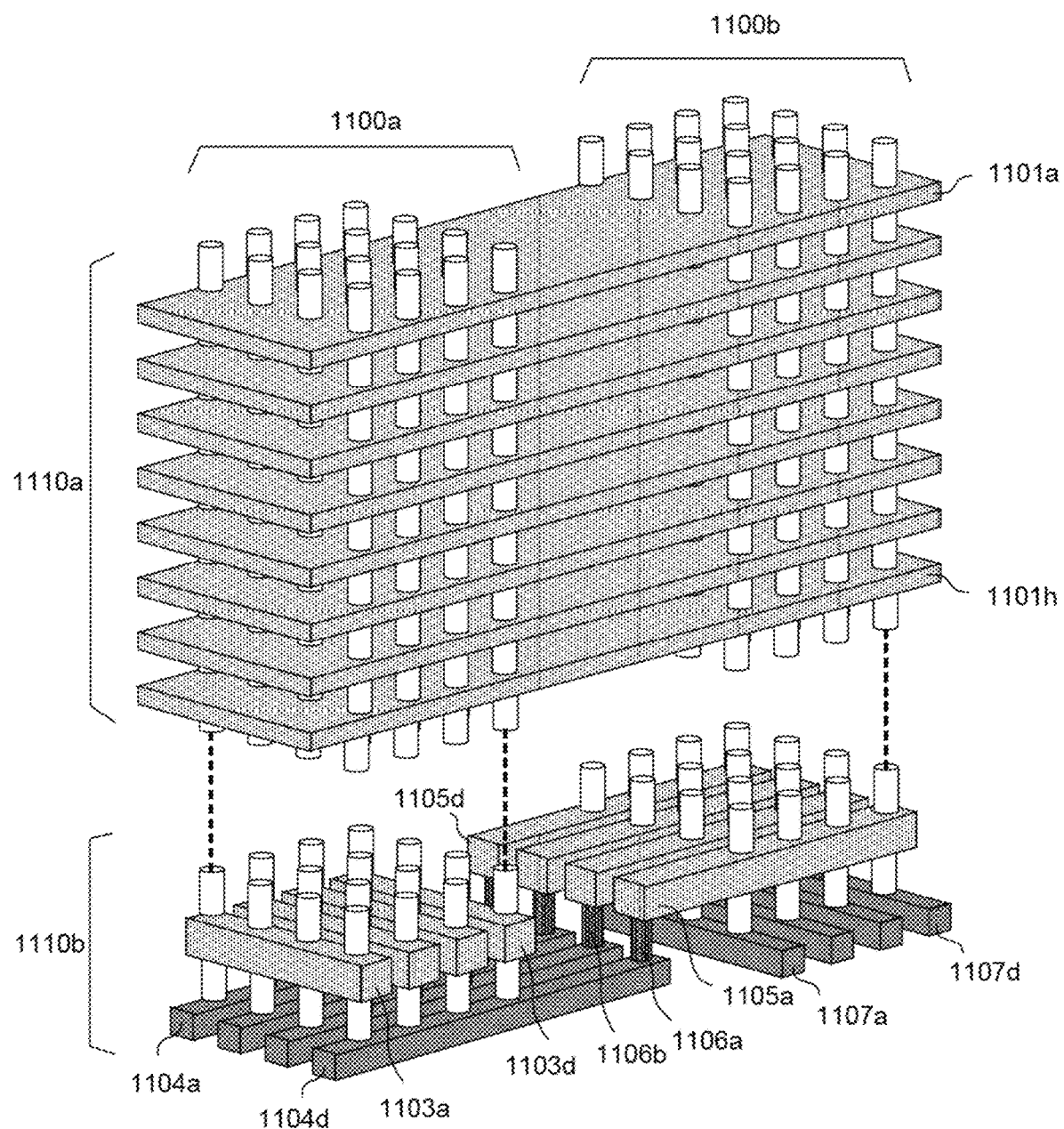
FIG. 11 shows an exemplary embodiment of two neuron layers of a neural network.

FIG. 11 shows an exemplary embodiment of two neuron layers of a neural network. The neural network comprises neuron layers 1100a and 1100b. A top portion 1110a comprises multiple synapse layers 1101a-h. A bottom portion 1110b comprises input neurons 1103a-d and 1105a-d, and output neurons 1104a-d and 1107a-d. The output neurons 1104a-d of the first layer 1100a are connected to the input neurons 1105a-d of the second layer 1100b through contacts, such as contacts 1106a-b. In various exemplary embodiments, the output neurons of one network layer are directly connected to the select gates of the next network layer's input neurons without using operational amplifiers or comparators. This significantly reduce the circuit size and results in very compact neural network arrays. In this application, the output neurons of a network layer are solid-connected to the input neurons of the next network layers. Therefore, the number of the input and out neurons in each layer is fixed.

Alternatively, in other exemplary embodiments, pass gates are added between the output neurons and the next network layer's input neurons. This provides increased flexibility in configuring the neural network's number of layers and neurons in each layer. It also provides an accessibility that each layer's neurons may be selectively controlled by periphery circuits for program operation.

Figure 12:
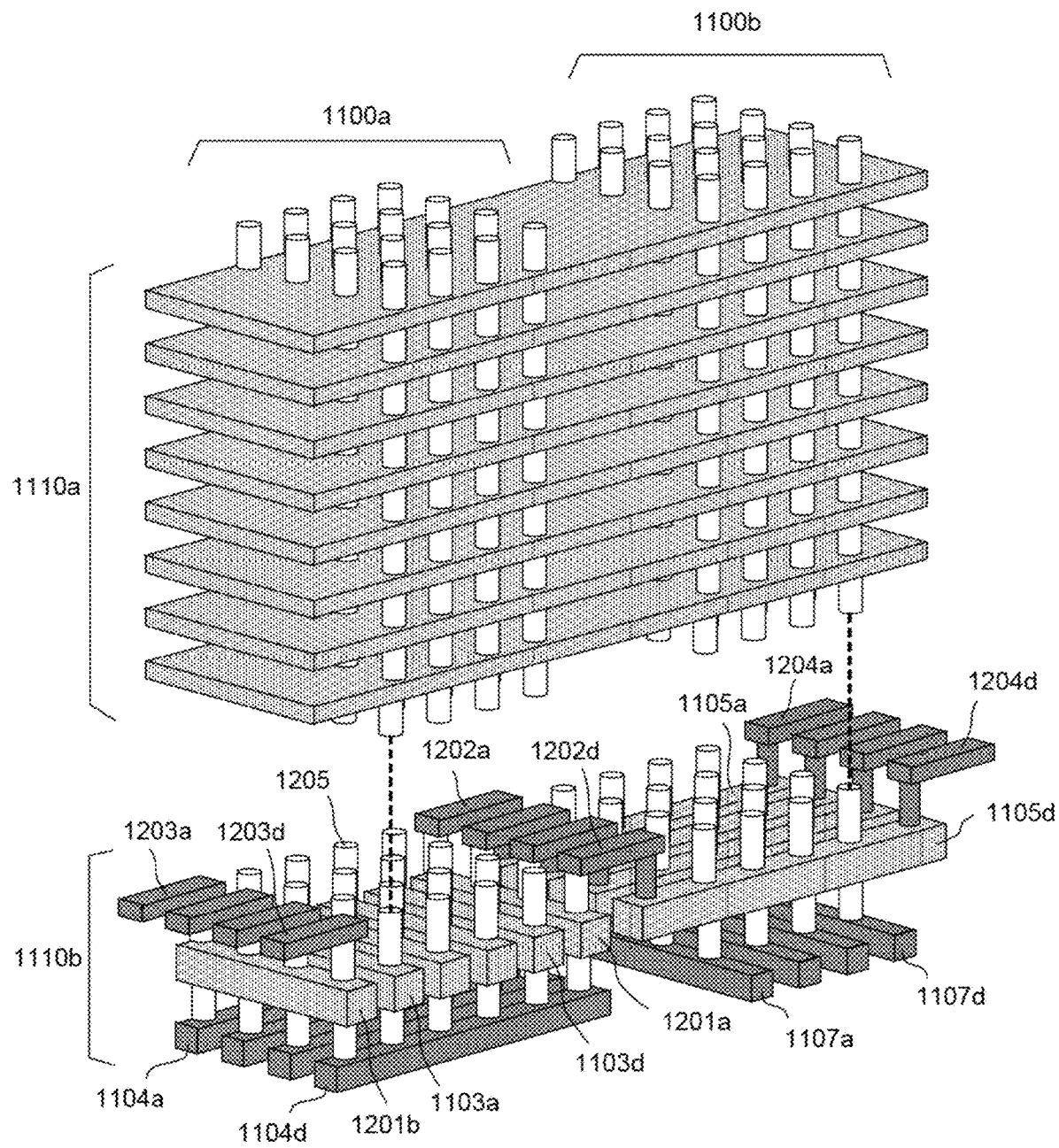
FIG. 12 shows a detailed exemplary embodiment of the array shown in FIG. 11.

FIG. 12 shows a detailed exemplary embodiment of the array shown in FIG. 11. In FIG. 12, the output neurons 1104a-d of the first network layer 1100a are connected to the input neurons 1105a-d of the next network layer 1100b through vertical pass gates 1201a. When the vertical pass gates 1201a are turned on, the output neurons' voltages are passed to the conductor layers 1202a-d that are connected to the input neurons 1105a-d through contacts.

Similarly, the output neurons 1104a-d may be connected to input neurons of an adjacent network layer (not shown) through vertical pass gates 1201b and the conductor layers 1203a-d.

Similarly, the input neurons 1105a-d may be connected to output neurons of an adjacent network layer (not shown) through the conductor layer 1204a-d. The conductor layer 1202a-d may be the same metal layer as landing pads (not shown) on each vertical channel of the select gates, such as vertical channel 1205. The output neurons 1104a-d and 1107a-d may be formed by conductor layers, such as metal or polysilicon, or diffusion layer. At least one advantage of this embodiment is that when using metal layers as the output neurons, the entire 3D array including the bottom structure may be located on top of other circuits, such as CPU, for example. Thus, the footprint for the 3D neural network array would require no additional silicon.

Figure 13:
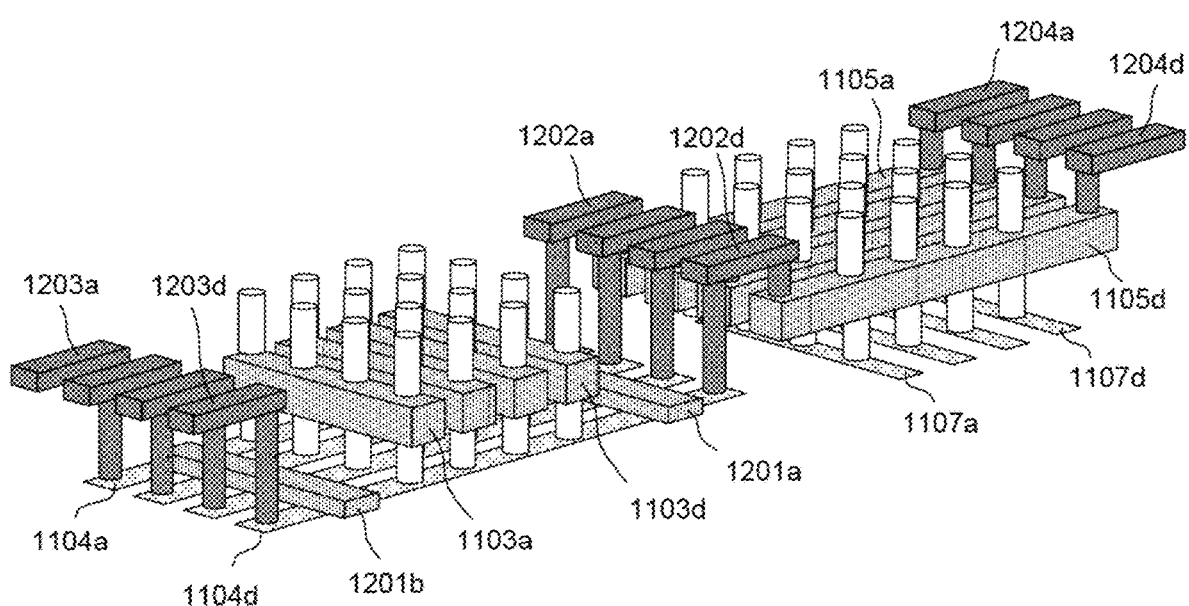
FIG. 13 shows another exemplary embodiment of the array shown in FIG. 11.

FIG. 13 shows another exemplary embodiment of the array shown in FIG. 11. In this embodiment, the output neuron layers 1104a-d and 1107a-d are diffusion layers on the substrate. The pass gates 1201a-b are planar transistors.

Figure 14A:
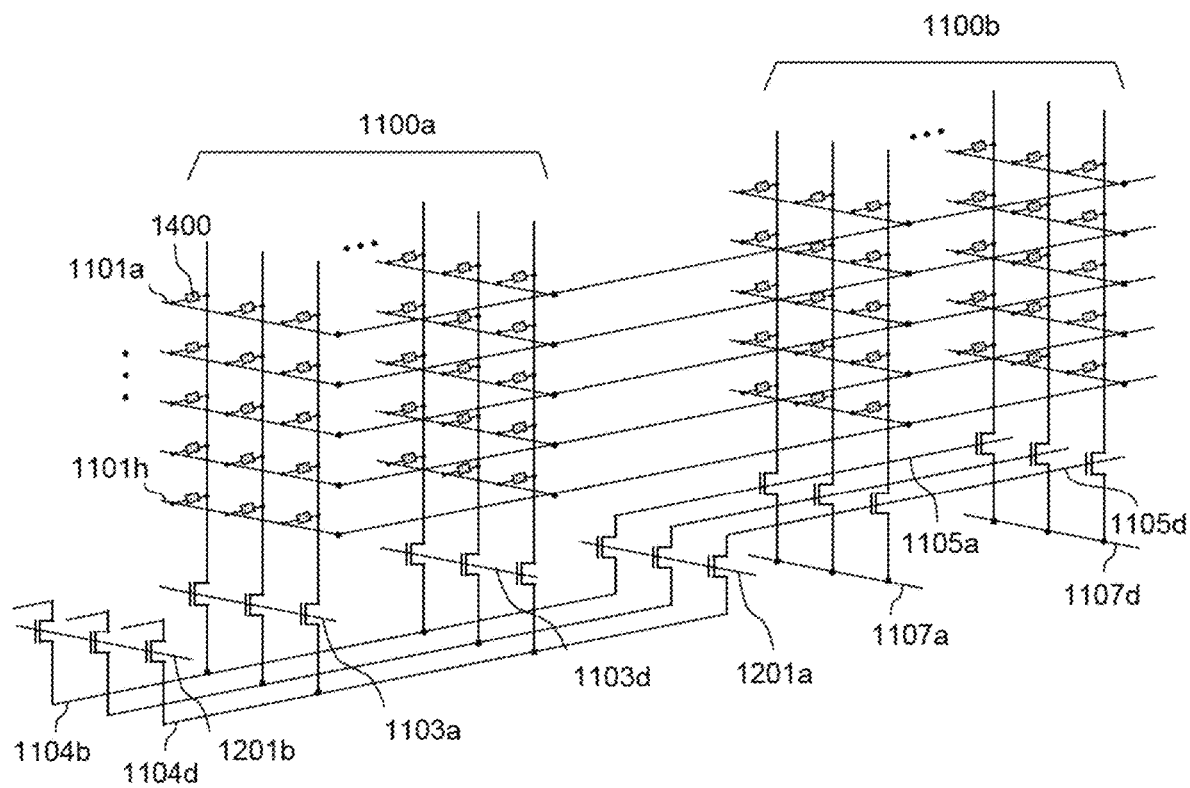
FIG. 14A shows an exemplary embodiment of an equivalent circuit of the 3D neural network array shown in FIG. 12.

FIG. 14A shows an exemplary embodiment of an equivalent circuit of the 3D neural network array shown in FIG. 12. Please notice, the output neurons 1104a-d are connected to the input neurons 1105a-d of the next network layer through the pass gates (1201a). A synapse 1400 is also shown.

Figure 14B:
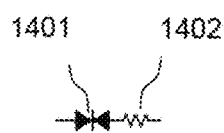
FIG. 14B shows an exemplary embodiment of a synapse.

FIG. 14B shows an exemplary embodiment of a synapse. For example, the synapse shown in FIG. 14B is suitable for use as the synapse 1400 shown in FIG. 14A. The synapse comprises a selector 1401 and a resistive element 1402 that alternatively can be a phase-change element.

Figure 15A:
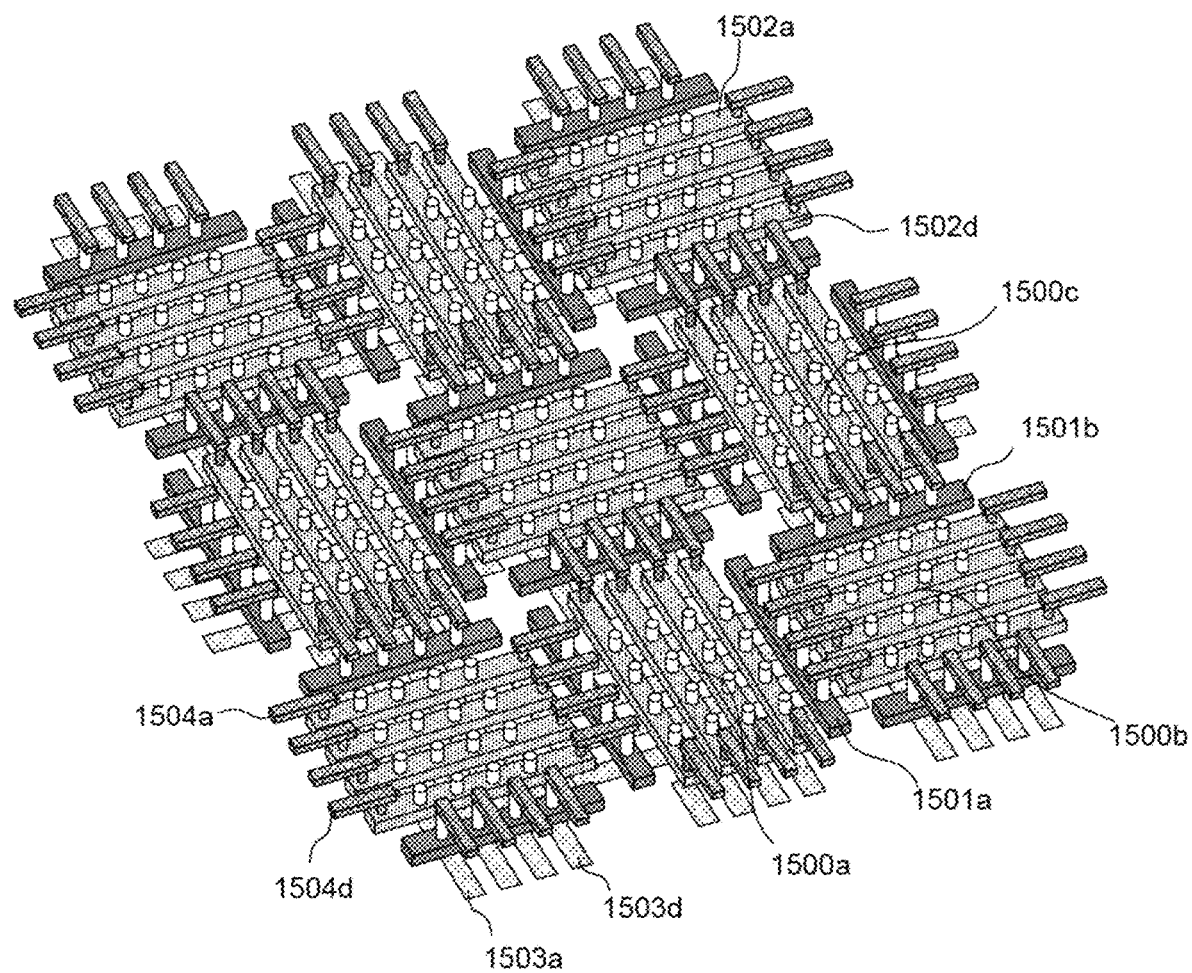
FIG. 15A shows an exemplary embodiment of a bottom structure of the 3D neural network array shown on FIG. 12.

FIG. 15A shows an exemplary embodiment of a bottom structure of the 3D neural network array shown on FIG. 12. The bottom structure comprises multiple neuron layers, such as neuron layers 1500a-c. Each layer may be connected to adjacent layers through pass gates, such as pass gates 1501a-b. In this embodiment, the pass gates are formed by vertical transistors. Also shown are input neurons 1502a-d, output neurons 1503a-d, and conductor layers 1504a-d.

Figure 15B:
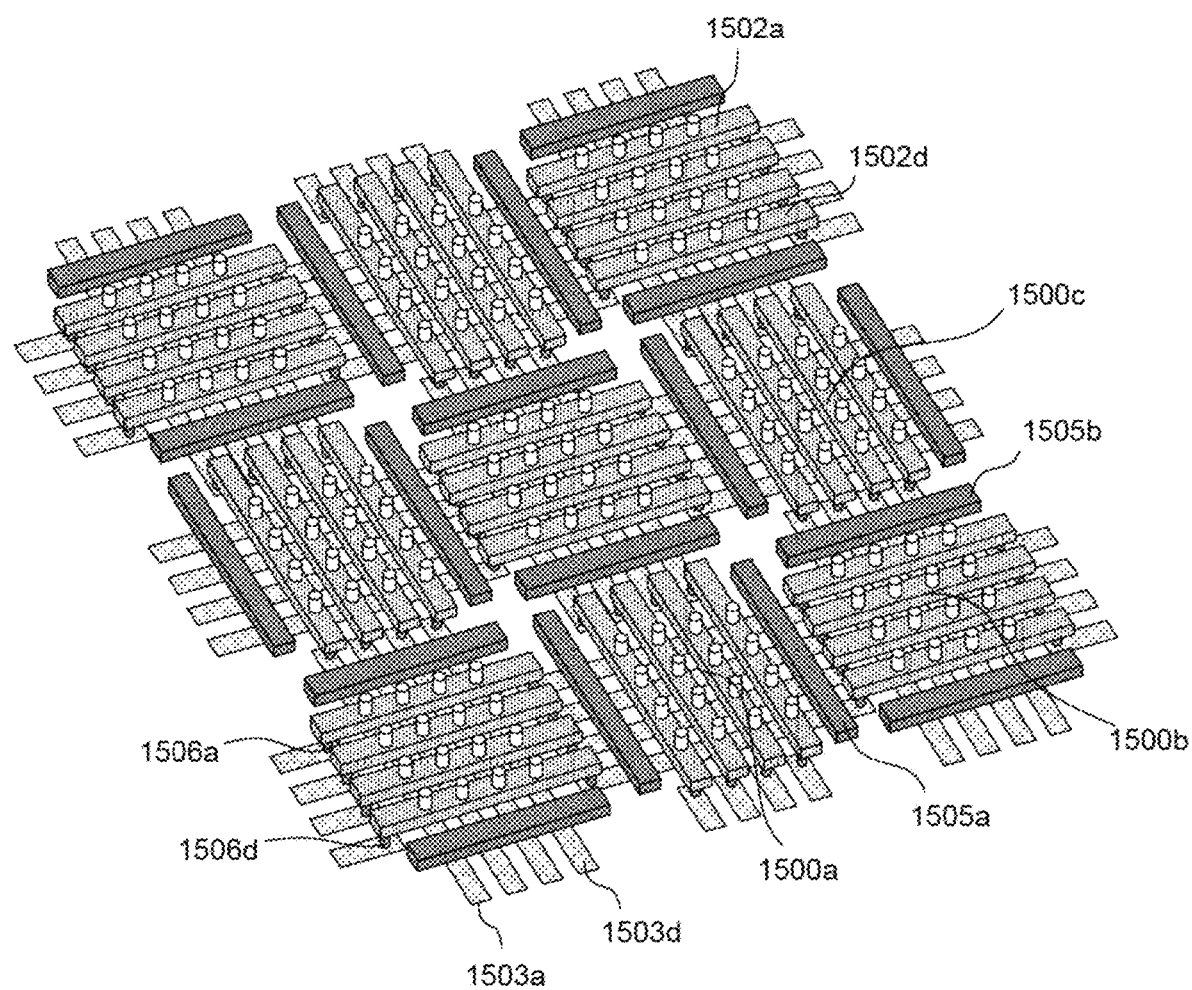
FIG. 15B shows an exemplary embodiment of the bottom structure of the 3D neural network array shown in FIG. 13.

FIG. 15B shows an exemplary embodiment of the bottom structure of the 3D neural network array shown in FIG. 13. In this bottom structure, the pass gates 1505a-b are formed by planar transistors. The output neurons 1503a-d are formed by diffusion layers. The output neurons may be connected to the adjacent network layers' input neurons through contacts 1506a-d.

Figure 16A:
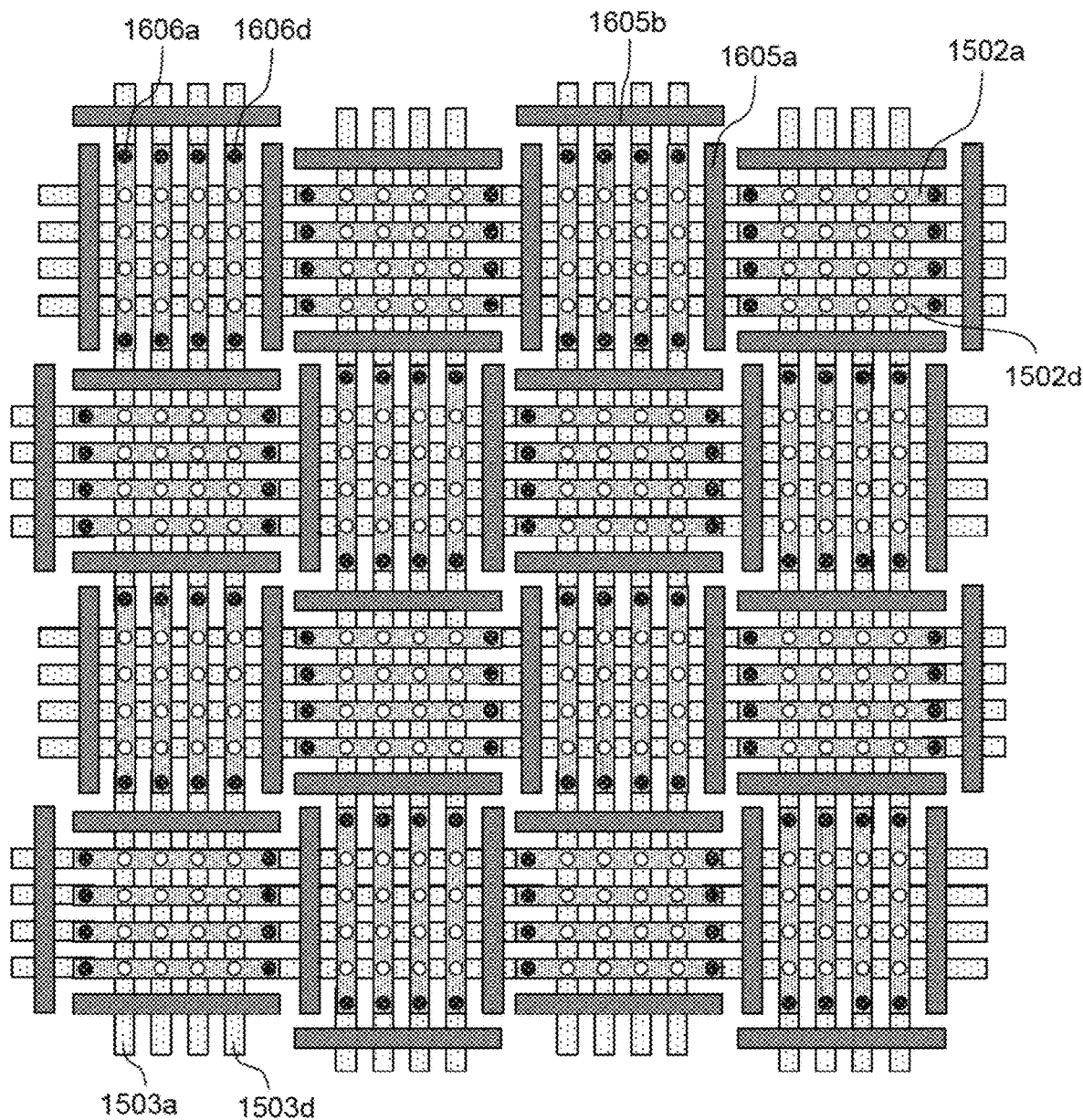
FIG. 16A shows an exemplary embodiment of a top view of a bottom structure similar to that shown in FIG. 15B.

FIG. 16A shows an exemplary embodiment of a top view of a bottom structure similar to that shown in FIG. 15B. However, for FIG. 16A a 4×4 network layer structure is shown. It also should be noted that similar process operations may be applied to the embodiment shown in FIG. 15A.

Figure 16B:
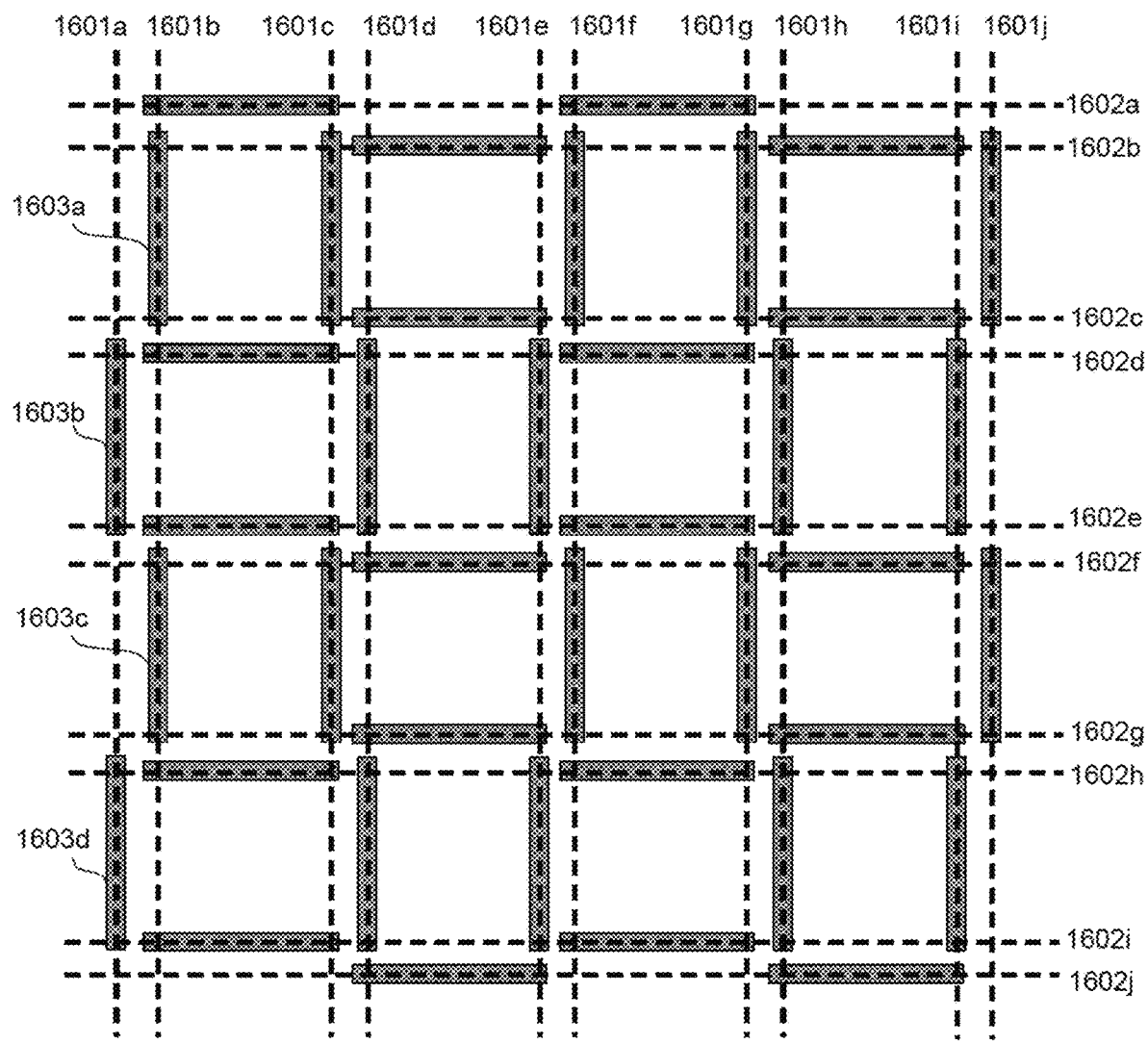
FIG. 16B shows an exemplary embodiment of the top view shown in FIG. 16A and illustrates the connection of the pass gates.

FIG. 16B shows an exemplary embodiment of the top view shown in FIG. 16A and illustrates the connection of the pass gates. For ease of understanding, only the pass gates are shown. The pass gates may be connected to vertical signal lines 1601a to 1601j and horizontal signal lines 1602a to 1602j as shown. The signal lines may be formed by metal layers. The signals lines may be connected to decoder circuits to selectively turn the pass gates on or off. It should be noted that the connections shown in FIG. 16B are exemplary and it should be noted that the pass gates may be connected in many other suitable ways. For example, in another exemplary embodiment, the number of vertical signal lines may be doubled, thus the select gates 1603a to 1603d may be connected to different signal lines to provide higher flexibility.

Figure 17A:
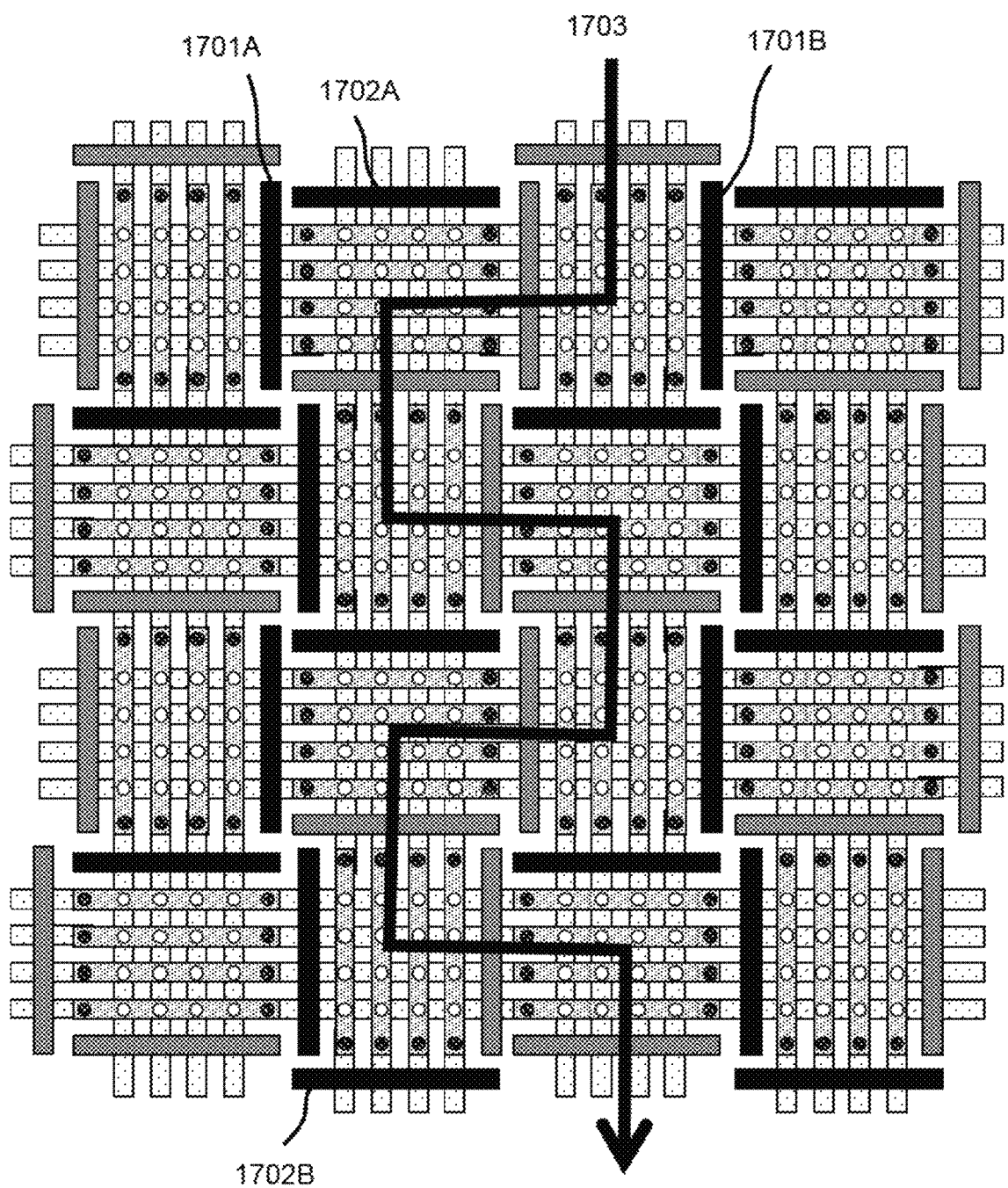
FIG. 17A shows an embodiment of using the pass gates to configure the neural network illustrated in FIG. 16A.

FIG. 17A shows an embodiment of using the pass gates to configure the neural network illustrated in FIG. 16A. The pass gates being turned on are shown in grey color. The pass gates being turned off are shown in black color. The vertical pass gates such as 1701a and 1701b set the boundary of the neural network. The horizontal pass gates such as 1702a and 1702b set the direction of the neural network. As a result, a multiple-layer neural network is configured as shown by the arrow line 1703. For example, the arrow 1703 shows the signal flow through the neural network layers based on the enabled pass gates.

Figure 17B:
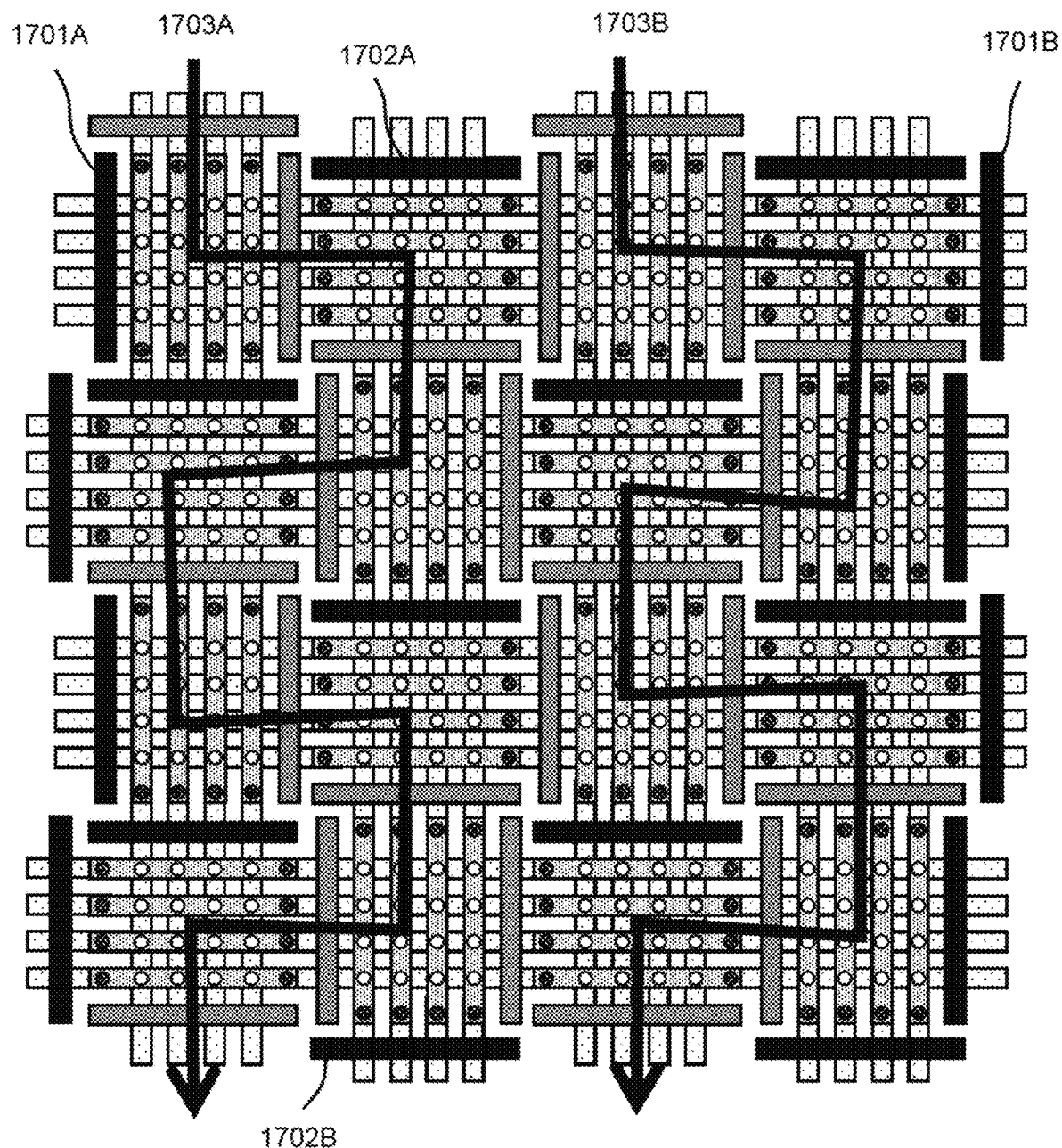
FIG. 17B shows another embodiment of configuring the neural network illustrated in FIG. 16A.

FIG. 17B shows another embodiment of configuring the neural network illustrated in FIG. 16A. By changing the boundary 1701a and 1701b, the neurons of each layer may be increased or decreased. For example, compared with the neural network in FIG. 17A, the neural network shown in FIG. 17B has twice the number of neurons in each layer, as illustrated by the arrow lines 1703a and 1703b.

Figure 17C:
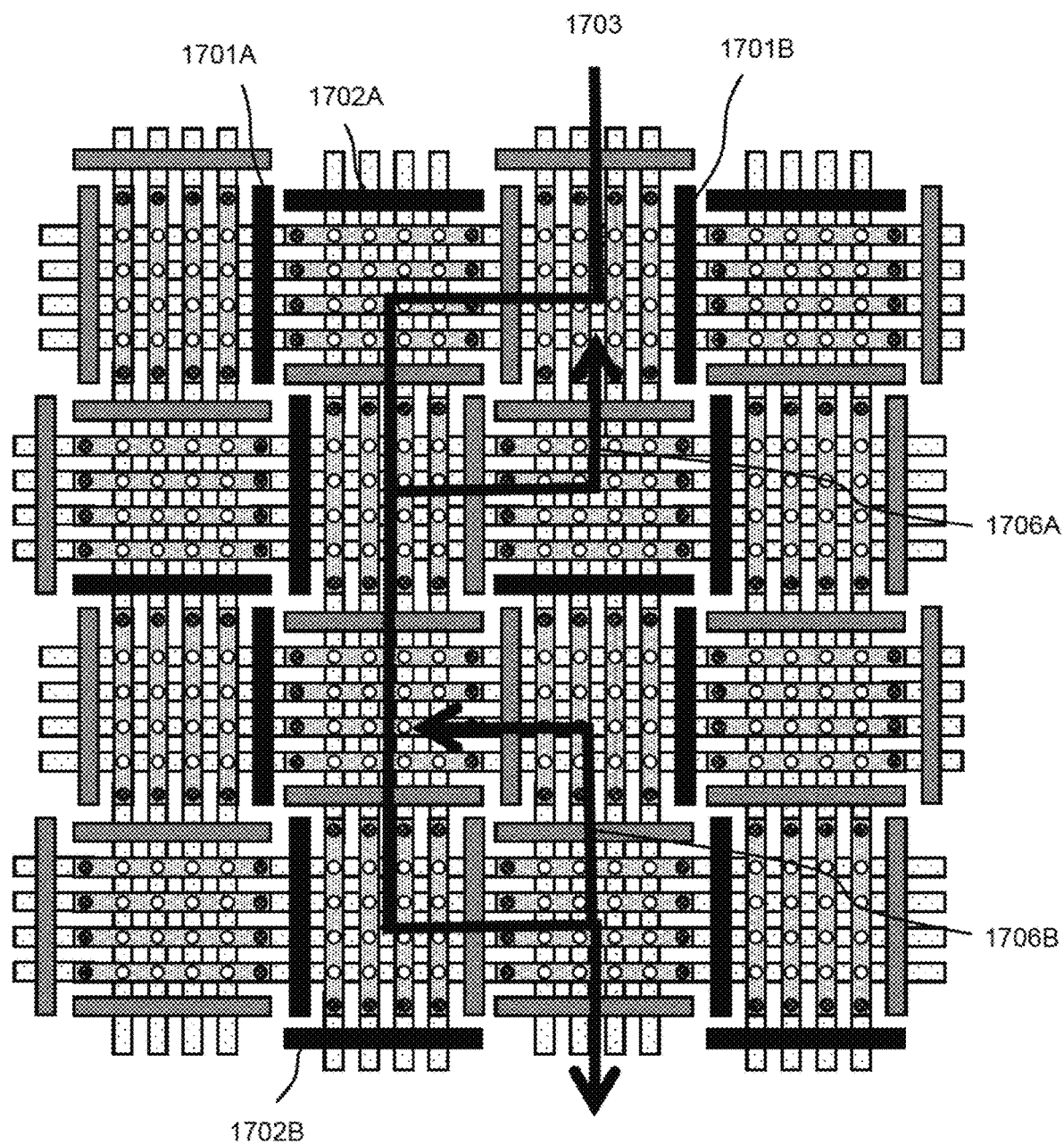
FIG. 17C shows another embodiment of configuring the neural network illustrated in FIG. 16A.

FIG. 17C shows another embodiment of configuring the neural network illustrated in FIG. 16A. In this embodiment, the neural network path shown by the arrow line 1703 has feedback loops 1706a and 1706b. Thus, this neural network forms a 'concurrent' neural network.

Figure 17D:
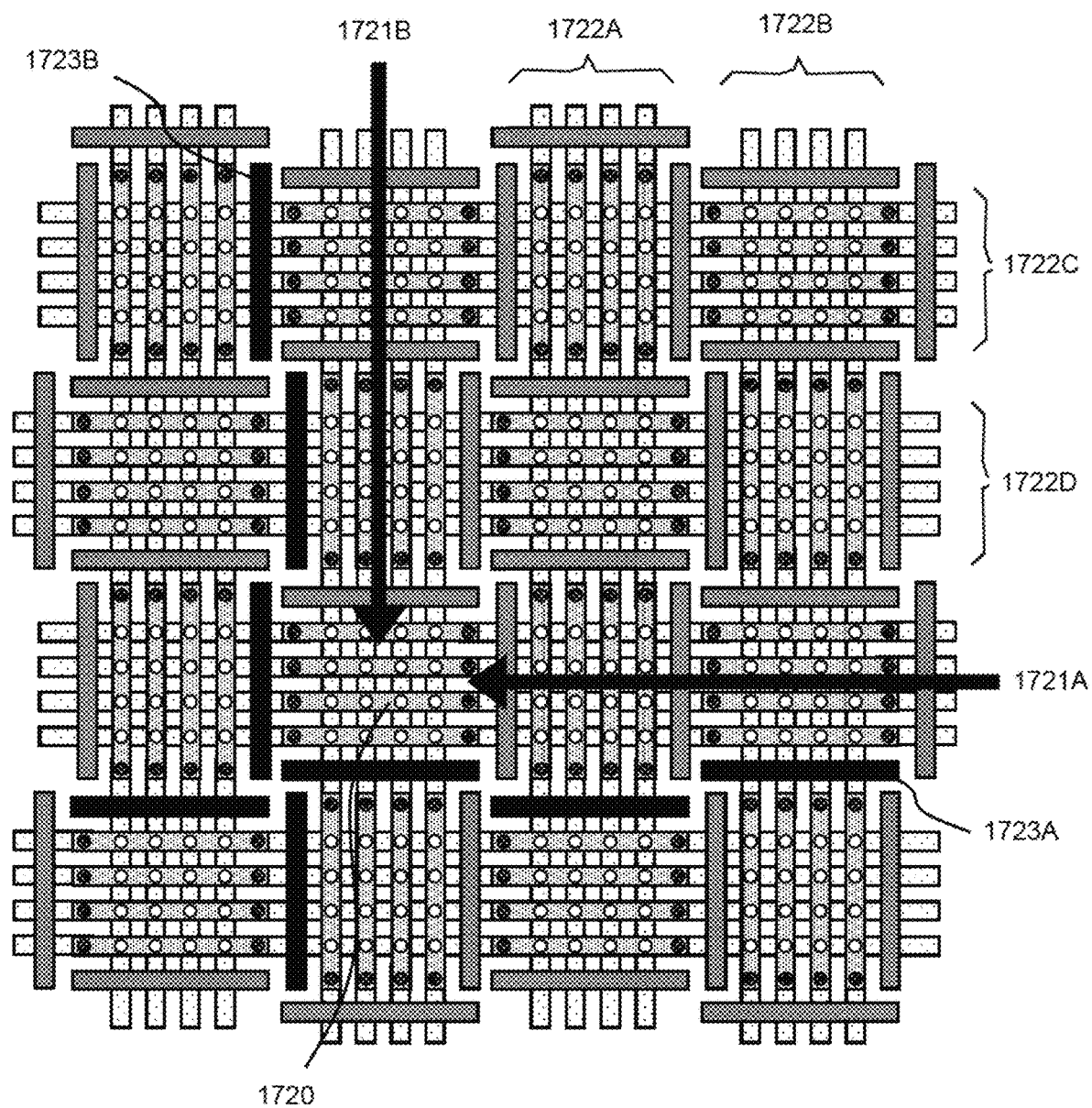
FIG. 17D shows another embodiment of configuring the neural network illustrated in FIG. 16A.

FIG. 17D shows another embodiment of configuring the neural network illustrated in FIG. 16A. In this configuration, the input neurons and output neurons of the selected layer 1720 may be accessed by periphery circuits, as shown in arrow lines 1721a and 1721b, respectively. The input lines of 1722a to 1722d may be supplied with 0V to turn off the select gates along the path of arrow lines 1721a and 1721b. The pass gates shown in black such as 1723a and 1723b may be turned off to isolate the selected area. Thus, other parts of the array may be used for other operations during this operation. This mode may be used to program the synapses of the selected layer.

In an exemplary embodiment, it is possible to 'directly training the neural network' without using a traditional back-propagation algorithm. The approach directly selects a neuron and changes its output higher or lower to see which direction reduces the output error. Then, the synapses connected to this neuron are changed accordingly. These steps are repeated for all the neurons until all the synapses are changed. This is called an iteration. The system may repeat the iterations to reduce the output error continuously until the desired error is reached.

In another exemplary embodiment, the synapses connected to a selected neuron are directly programmed to make the neuron's output higher or lower. A check is performed to compare the output to a target value to determine an output error. If the output error is reduced, the system may select the next neuron and repeat the operations. If the error is increased, the system may apply a reverse-program to the synapses connected to the neuron, to reduce neuron's output, and then check the output error. If the error is reduced, the system may select the next neuron and repeat the operations. By using this approach, the mathematically heavy computations used for back-propagation can be eliminated.

In various exemplary embodiments, the 3D neural network arrays disclosed herein are suitable for programming by a direct training approach.

Figure 18:
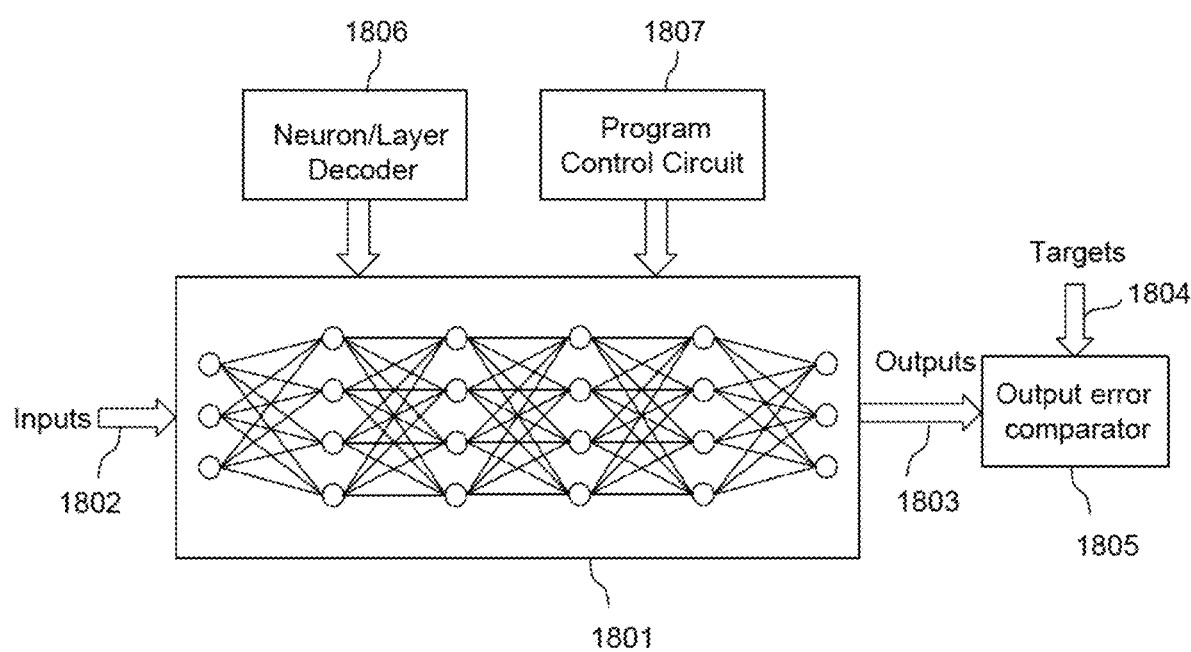
FIG. 18 shows an exemplary embodiment of a programming system suitable to directly program 3D neural networks arrays.

FIG. 18 shows an exemplary embodiment of a programming system suitable to directly program 3D neural networks arrays. As illustrated in FIG. 18, a neural network array 1801 is programmed by the programming system. The inputs 1802 are fed into the neural network to generate the outputs 1803. The outputs are compared with target values 1804 by an output error comparator 1805. The neuron/layer decoder 1806 selects a layer and a neuron to allow a program control circuit 1807 to access the neuron. The program control circuit may change the selected neuron's output, and check the output error comparator to determine the direction of the change. If the output is within a selected range, the program control circuit 1807 programs the synapses connected the neuron by appropriately biasing them. After that, the neuron/layer decoder may select the next neuron for programming.

While exemplary embodiments of the present invention have been shown and described, it will be obvious to those with ordinary skills in the art that based upon the teachings herein, changes and modifications may be made without departing from the exemplary embodiments and their broader aspects. Therefore, the appended claims are intended to encompass within their scope all such changes and modifications as are within the true spirit and scope of the exemplary embodiments of the present invention.

What is claimed is:

1. A three-dimensional (3D) neural network array, comprising:
a plurality of stacked synapse layers having a first orientation;
a plurality of synapse lines having a second orientation and passing through the synapse layers;
synapse elements connected between the synapse layers and synapse lines, and wherein each synapse element includes a programmable resistive element;
a plurality of output neurons; and
a plurality of select transistors connected between the synapse lines and the output neurons, and wherein gates of the select transistors receive input signals.

2. The 3D neural network of claim 1, wherein the select transistors are configured as one of PMOS or NMOS transistors.

3. The 3D neural network of claim 1, wherein the select transistors are configured as native transistors having little or substantially no voltage drop.

4. The 3D neural network of claim 1, wherein the first orientation is horizontal and the second orientation is vertical.

5. The 3D neural network of claim 1, wherein each programmable resistive element comprises material selected from a set of materials comprising resistive material, phase change material, ferroelectric material, and magnetic material.

6. The 3D neural network of claim 1, wherein each synapse element includes a diode.

7. The 3D neural network of claim 6, wherein the diodes comprise at least one of diode material, Schottky diode material, NbOx material, TaOx material and VCrOx material.

8. The 3D neural network of claim 1, further comprising pull-up transistors coupled to the output neurons.

9. The 3D neural network of claim 1, further comprising pull-down transistors coupled to the output neurons.

10. The 3D neural network of claim 1, wherein the output neurons are formed as surface diffusions.

11. The 3D neural network of claim 1, further comprising conductive contacts connected to the output neurons.

12. The 3D neural network of claim 11, wherein the conductive contacts further comprise in-line pass transistors.

13. The 3D neural network of claim 12, wherein the pass transistors are formed as planar transistors.

14. The 3D neural network of claim 13, wherein the 3D neural network forms a first neural network layer and wherein the conductive contacts are connected between the output neurons and gate terminals of select transistors associated with a second neural network layer.

15. The 3D neural network of claim 14, wherein the pass transistors are enabled or disabled to control signals flowing from the first neural network layer to the second neural network layer.

16. The 3D neural network of claim 1, wherein the 3D neural network array is stacked on a semiconductor device so that the 3D neural network array uses no additional semiconductor surface area.

17. A method for generating a 3D neural network array, the method comprising operations of:
- forming output neuron layers;
- forming select gates on the output neuron layers, wherein the select gates cross from a first output neuron layer to an adjacent output neuron layer;
- forming vertical channels on the select gates, wherein landing pads are formed on top of the vertical channels;
- forming multiple synapse layers on top of the select gates; and
- forming synapse lines through the synapse layers, wherein the synapse lines connect to corresponding landing pads.

\* \* \* \* \*